(12) United States Patent
Sharp et al.

(10) Patent No.: US 6,665,680 B2
(45) Date of Patent: *Dec. 16, 2003

(54) DATABASE STRUCTURE HAVING TANGIBLE AND INTANGIBLE ELEMENTS AND MANAGEMENT SYSTEM THEREFORE

(76) Inventors: Gary L. Sharp, 6930 Barbarossa St., Boca Raton, FL (US) 33433; Charles K. Simon, deceased, late of Boca Raton, FL (US); Liane N. Simon, legal representative, 2800 S. Ocean Blvd. Apt. 5D, Boca Raton, FL (US) 33432

(*) Notice: Subject to any disclaimer, the term of this patent is extended or adjusted under 35 U.S.C. 154(b) by 0 days.

This patent is subject to a terminal disclaimer.

(21) Appl. No.: 10/322,093

(22) Filed: Dec. 17, 2002

(65) Prior Publication Data

US 2003/0135483 A1 Jul. 17, 2003

Related U.S. Application Data

(63) Continuation of application No. 09/455,084, filed on Dec. 6, 1999, now Pat. No. 6,510,433, which is a continuation of application No. PCT/US98/11077, filed on Jun. 1, 1998.
(60) Provisional application No. 60/048,515, filed on Jun. 4, 1997, now abandoned.

(51) Int. Cl.[7] .............................................. G06F 7/00
(52) U.S. Cl. ............................................ 707/100
(58) Field of Search ............... 707/1–6, 100–102, 707/103 R, 103, 103 Y, 103 Z, 104.1

(56) References Cited

U.S. PATENT DOCUMENTS

| | | | | |
|---|---|---|---|---|
| 5,717,924 A | * | 2/1998 | Kawai | 707/102 |
| 5,740,421 A | * | 4/1998 | Palmon | 707/4 |
| 5,745,755 A | * | 4/1998 | Covey | 707/203 |
| 5,806,060 A | * | 9/1998 | Borgida et al. | 707/3 |
| 6,038,560 A | * | 3/2000 | Wical | 707/5 |
| 6,167,370 A | * | 12/2000 | Tsourikov et al. | 704/9 |
| 6,263,335 B1 | * | 7/2001 | Paik et al. | 707/5 |
| 6,269,356 B1 | * | 7/2001 | Hatton | 706/55 |
| 6,334,125 B1 | * | 12/2001 | Johnson et al. | 707/3 |
| 6,345,277 B1 | * | 2/2002 | Goldman et al. | 707/100 |

FOREIGN PATENT DOCUMENTS

| | | | |
|---|---|---|---|
| EP | 638870 A1 | * | 2/1995 |
| WO | WO 99/34307 | * | 7/1999 |

\* cited by examiner

*Primary Examiner*—Maria N. Von Buhr
(74) *Attorney, Agent, or Firm*—Akerman Senterfitt

(57) ABSTRACT

A database of information stored in a fixed medium, and a method for creating and managing such a database, the database comprising: a set of tangible data elements, the tangible data elements representing things which have physical weight and can cause an effect; a set of intangible data elements, the intangible data elements representing words and concepts which have no physical weight and cannot be weighed; the set of intangible data elements including a first subset of effect data elements (16), the effect data elements representing verbs standing alone and in combination with other words, which describe actions, objectives, results, missions, and procedures and processes; and, the set of intangible data elements including a second subset of descriptive data elements (18), the descriptive data elements describing the tangible data elements, the effect data elements and degrees of performance of the tangible data elements.

46 Claims, 27 Drawing Sheets

FIG. 3(a)
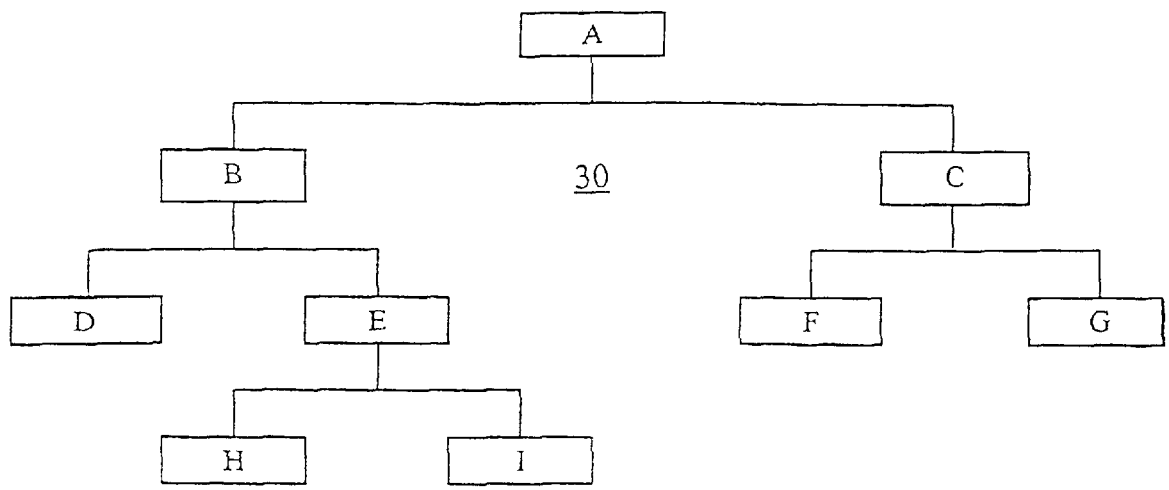
FIG. 3(b)
Outline of "A"
I. B
   A. D
   B. E      32
      1. H
      2. I
II. C
   A. F
   B. G
FIG. 3(c)     34
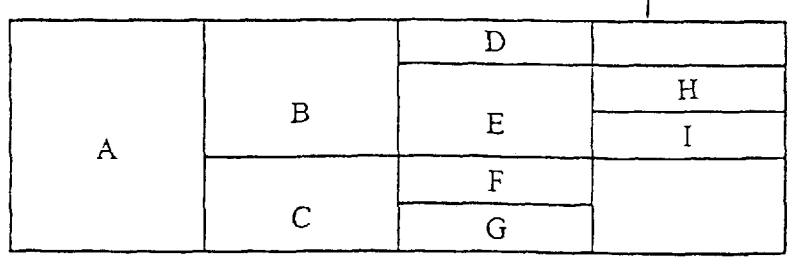

CAUSE STRUCTURE

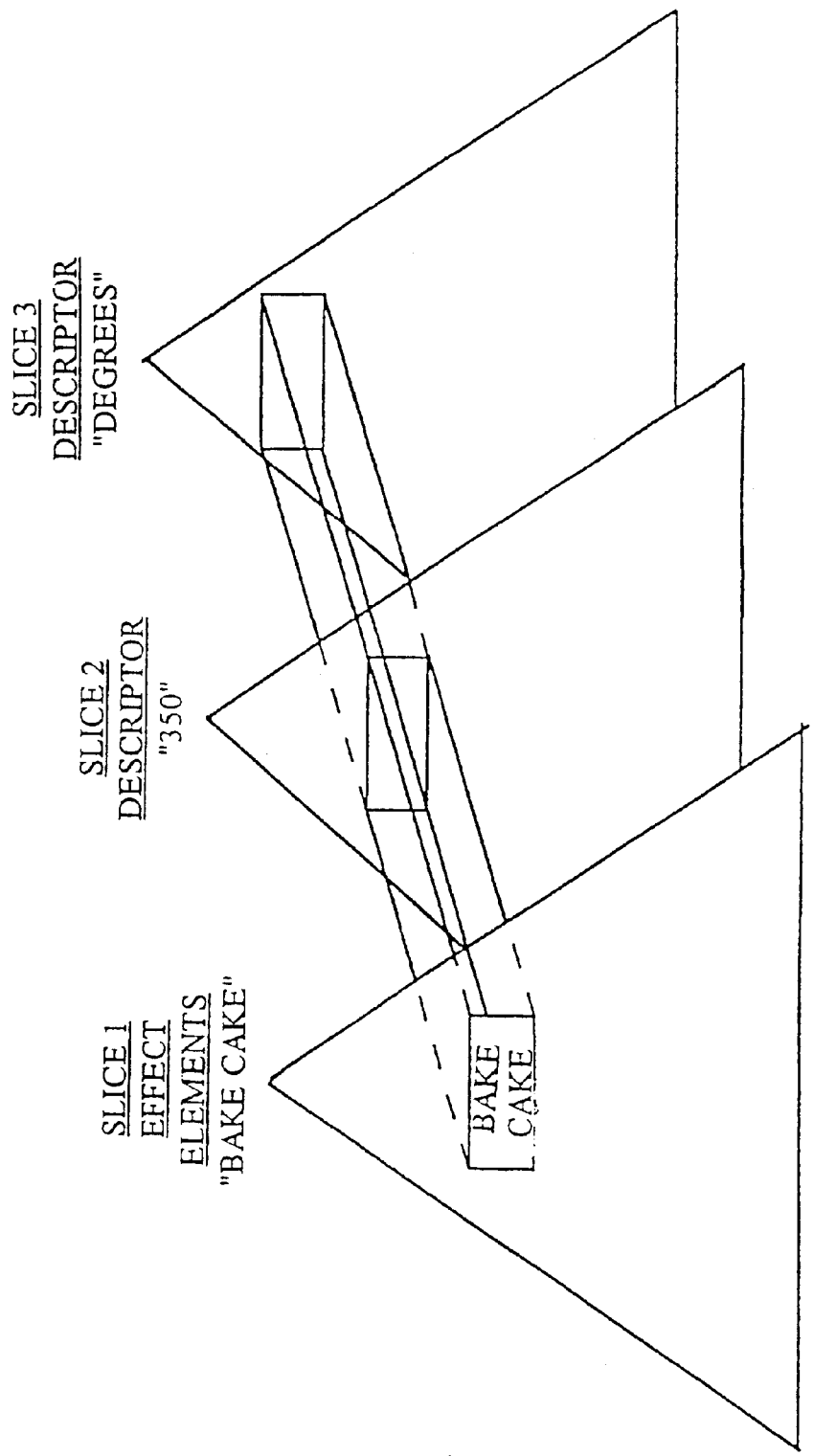

FIG. 9(a)

MINDBASE CAUSE STRUCTURE #1

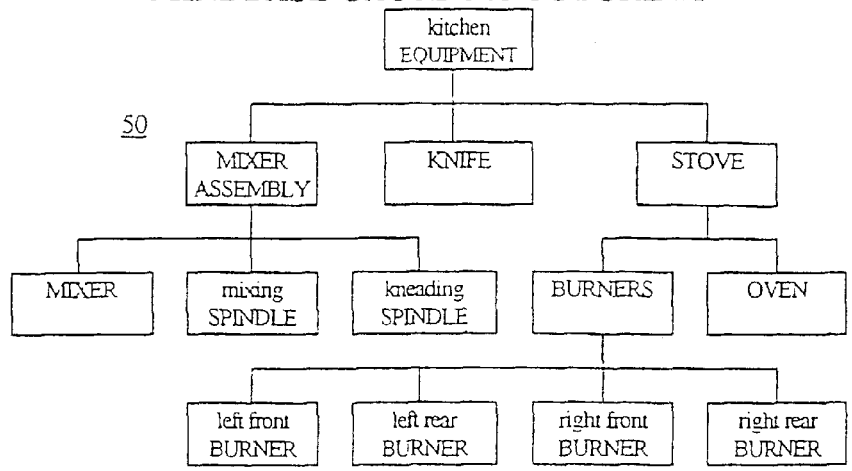

FIG. 9(b)

SAMPLE DATA ELEMENT HIERARCHIES

| | DATA ELEMENT NUMBERS AS CALCULATED IN STEP 4 OF THE ADS CODING TECHNIQUE ARE BELOW EACH ELEMENT. | | | |
|---|---|---|---|---|
| | HIERARCHY FOR kitchen EQUIPMENT | HIERARCHY FOR KNIFE | HIERARCHY FOR mixing SPINDLE | HIERARCHY FOR left front BURNER |
| LEVEL 1 | kitchen EQUIPMENT 1 | kitchen EQUIPMENT 1 | kitchen EQUIPMENT 1 | kitchen EQUIPMENT 1 |
| LEVEL 2 | | KNIFE 2 | MIXER ASSEMBLY 1 | STOVE 3 |
| LEVEL 3 | | | mixing SPINDLE 2 | BURNERS 1 |
| LEVEL 4 | | | | left front BURNER 1 |

FIG. (9c)
MINDBASE CODES

| | DATA ELEMENT CODES | | | | | | | | | | | |
|---|---|---|---|---|---|---|---|---|---|---|---|---|
| | FIRST DATA FIELD | | SECOND DATA FIELD | | THIRD DATA FIELD | | FOURTH DATA FIELD | | FIFTH DATA FIELD | | SIXTH DATA FIELD | |
| DATA ELEMENTS | STRUCTURE NUMBER | | LEVEL OF DATA ELEMENT | | FIRST LEVEL OF SUB-STRUCTURE | | POSITION ON THE SECOND LEVEL OF SUB-STRUCTURE | | POSITION ON THE THIRD LEVEL OF SUB-STRUCTURE | | POSITION ON THE FOURTH LEVEL OF SUB-STRUCTURE | |
| kitchen EQUIPMENT | 0 | 1 | 0 | 1 | 0 | 1 | | | | | | |
| KNIFE | 0 | 1 | 0 | 2 | 0 | 1 | 0 | 2 | | | | |
| mixing SPINDLE | 0 | 1 | 0 | 3 | 0 | 1 | 0 | 1 | 0 | 2 | | |
| left front BURNER | 0 | 1 | 0 | 4 | 0 | 1 | 0 | 3 | 0 | 1 | 0 | 1 |

MINDBASE EFFECT STRUCTURE #1

MINDBASE EFFECT STRUCTURE #2

DATABASE STRUCTURE HAVING TANGIBLE AND INTANGIBLE ELEMENTS AND MANAGEMENT SYSTEM THEREFORE

CROSS REFERENCE TO RELATED APPLICATIONS

This application is a continuation application of Ser. No. 09/455,084 filed Dec. 6, 1999, now issued as U.S. Pat. No. 6,510,433, which is a continuation of Ser. No. PCT/US98/11077, filed Jun. 1 1998, which claims the benefit of Ser. No. 60/048,515 filed Jun. 4, 1997 now abandoned.

BACKGROUND OF THE INVENTION

1. Field of the Invention

This invention relates generally to the field of database management, and in particular, to a new organizational protocol for creating and manipulating relational databases and database structures.

2. Description of Related Art

When the computer was introduced into the business mainstream, there were no database programs available. Users copied their paper files into computer memory without changing the structure of their stored data. Eventually database programs became widely available. Each program had its own set of rules for structuring databases. Users used the rules of these programs to structure data anyway they desired. Many users continued to structure data the way it was already stored in paper files. Other users used templates or procedures that were suggested by the database vendor.

Eventually database programs evolved into the relational database model. This model had specific rules for structuring data. The degree of relationality for each relational database program could be judged by determining how closely the relational database adhered to the relational database model rules. The most recent database innovation is the object oriented database model. Object oriented programming stores functions, routines, and data as reusable objects.

All of the different types of database models have tried in their own unique way to solve the same major problems that are inherent in all currently available database systems. These problems are: (1) Almost all databases are heterogeneous and cannot be automatically integrated into a single database. Reprogramming is almost always necessary to fully integrate the relationships in two or more heterogeneous databases. Since reprogramming is often too expensive or too time consuming, almost all organizations with more than one database are not operating as efficiently as possible. (2) All relationships cannot be kept on line at all times. Existing database models are limited in the number of relationships that can be kept on line at any one time. This limits the operational capacity of current databases in such areas as universal searches on all relationships.

(3) Data is often duplicated with the same data elements being stored in multiple locations. This unnecessarily increases the size of databases and hinders the search process. Searches based on one location of a data element often miss desired results because the search often misses other locations of the same data element.

The human mind does not suffer from any of these problems. The mind automatically integrates heterogeneous data and therefore subconsciously works with a single homogeneous database. Proof of this lies in the fact that programmers use their minds to reprogram multiple heterogeneous databases into a single homogeneous database. The human mind keeps all relationships on line at all times. Excepting memory deficiencies, all knowledge we have ever stored is always available simultaneously. The human mind stores all data elements only once, or if it does store the same data element more than once, it links multiple storage locations for the same data element to act as if a data element is stored only once. Otherwise, we would have to consciously search different storage locations of the same data element, and we do not do that.

SUMMARY OF THE CONVENTION

Since the human mind is the only thing known that solves these problems, the human mind provided important clues in developing the inventive arrangements taught herein. Research has shown that the human brain uses the neuron-synapse-neuron to send signals and structure relationships. When one neuron fires to a specific degree of performance across a synapse, it causes the receptor neuron to perform to a specified degree of performance. The performance of the receptor neuron varies with the varying signal that is sent across the synapse. The inventive arrangements use the neuron-synapse-neuron model for structuring relationships of all data elements in a new database structure. Accordingly, the database system taught herein is referred to as the MINDBASE data system. Databases and database structures created in accordance with the MINDBASE data system are referred to as MINDBASE databases and database structures. This unique method of data relationship structuring is not found in any other database system.

Presently available databases do not categorize data elements into specific categories with rules for storing and manipulating each type of data element. The inventive arrangements categorize all MINDBASE data elements as either tangible data elements or intangible data elements. Tangible data elements are physical data elements that have weight. Tangible data elements are defined as "cause" data elements. Intangible data elements are all other data elements. Intangible data elements are further categorized into verbs which are identified as "effect" data elements and descriptive data elements which are identified as "descriptors.". Descriptors are used to describe tangible data elements and the degree of performance of tangible data elements.

Causes, effects, and descriptors have specific uses in the database structure and methods of the inventive arrangements, as are explained in detail herein. The unique categorization of cause, effect, and descriptive data elements and their specific uses is not followed by any other database system.

Presently available database management systems allow users to enter their data into the computer any way they choose. The inventive arrangements use a single unique format for storing all data. When using the inventive arrangements, all users enter their different data structures into this unique format. Although users can structure their data any way they choose, the computer only sees the same unique format in every database according to the inventive arrangements. This permits the MINDBASE format to be pre-programmed to accomplish many functions that must be repeatedly programmed when using other database systems. The integration routine is one of the very important functions that can be pre-programmed to automatically integrate an unlimited number of heterogeneous databases. Using MINDBASE's single unique data format for all data is not done by any other database system.

The MINDBASE format is based on the completely detailed information people have in their minds instead of the "verbal shorthand" that people generally use when speaking or writing. FIG. 1 is a pictorial description of this process. Since most people have the same background information, verbal shorthand works well in everyday communication. When people speak or write, they assume other people have the same verbal associations of knowledge that they have. Therefore they can leave out descriptive details because they assume the listener or reader already knows and remembers the missing relationships.

An example is the statement, "I have a red Chevrolet," The speaker is referring to a type of vehicle, which in this case is a car. The make of the car is a Chevrolet. Furthermore, the car is painted a color, which in this case is red. Since all parties have previously associated vehicle with car, car with Chevrolet, painted with color, and color with red, some of the descriptive details may be left out of the communication. Because all parties to the communication have the same background information the full meaning is conveyed.

For a computer system to simulate the way people communicate, it must have a way to store all of the descriptive details and word associations that people usually leave out of their communications. The MINDBASE system has the unique ability to store all of the possible relationships that are usually left out of verbal shorthand and all, other database systems. The MINDBASE system classifies each word as either a cause, an effect, or a descriptor. The MINDBASE system can also differentiate between multiple uses of the same word for different parts of speech. For example, some words like "book" can be a noun, verb, or an adjective. The MINDBASE system can advantageously be provided with a very detailed dictionary routine that classifies all words as causes, effects, or descriptors. This routine also differentiates between uses of the same word for different parts of speech.

When a user inputs a word into a MINDBASE database structure, the system compares this word to its classifications and relationships to determine if it is a cause, effect, or descriptor. If there is any ambiguity between the input word and the detailed dictionary, the routine will query the user regarding his or her intended use of the word. The MINDBASE system advantageously accepts verbal shorthand and can identify any missing word relationships that are left out of the user's input as a result of verbal shorthand. In this way the MINDBASE system carries on a two way communication with the user.

The MINDBASE system can advantageously accept information the way people normally express themselves and can communicate as necessary with the user to expand or translate the user's verbal shorthand information into the more detailed way that people subconsciously remember information. The MINDBASE system can then work with the information and subsequently return it to the user in the verbal shorthand way that it was received from the user. These procedures are unique to the MINDBASE system.

The MINDBASE system and the database and database structures created therewith have solved almost all of the problems that are inherent in presently available database systems. The most important problems the MINDBASE system solves are: (1) automatically integrating an unlimited number of heterogeneous databases into a single database; (2) storing all relationships on line at all times; and, (3) storing all data elements only once.

A database of information stored in a fixed medium, in accordance with an inventive arrangement, comprises: a set of tangible data elements, the tangible data elements representing things which have physical weight and can cause an effect; a set of intangible data elements, the intangible data elements representing words and concepts which have no physical weight and cannot be weighed; the set of intangible data elements including a first subset of effect data elements, the effect data elements representing verbs standing alone and in combination with other words, which describe actions, objectives, results, missions, procedures and processes; and, the set of intangible data elements including a second subset of descriptive data elements, the descriptive data elements describing the tangible data elements, the effect data elements and degrees of performance of the tangible data elements.

Within the foregoing structure, each tangible data element is linked to each effect data element partially or wholly caused by the tangible data element; each effect element is linked to each tangible data element required for the effect to occur; and, all data elements are stored in hierarchal structures of parent-child relationships.

A database system, in accordance with a further inventive arrangement, comprises: a database stored in a fixed medium and having a set of tangible data elements representing things which have physical weight and can cause an effect and a set of intangible data elements representing words and concepts which have no physical weight and cannot be weighed; the set of intangible data elements including a first subset of effect data elements representing verbs, standing alone and in combination with other words, which describe actions objectives, results, missions procedures and processes; and a second subset of descriptive data elements describing the tangible data elements, the effect data elements and degrees of performance of the tangible data elements; and, a dictionary routine for automatically classifying and storing words entered into the database according to the sets and subsets of data elements.

The dictionary routine can categorize each word into one of tangible data, effect data, descriptor data and other data.

A method for creating an information database in a fixed medium, in accordance with another inventive arrangement, comprises the steps of: identifying tangible data elements of the information, the tangible data elements representing things which have physical weight and can cause an effect; storing the tangible data elements of the information as a first set in the fixed medium; identifying intangible data elements of the information, the intangible data elements representing words and concepts which have no physical weight and cannot be weighed; identifying effect data elements within the intangible data elements, the effect data elements representing verbs standing alone and in combination with other words, which describe actions, objectives, results, missions, procedures and processes; storing the effect data elements of the information as a second set in the fixed medium; identifying descriptive data elements within the intangible data elements, the descriptive data elements describing the tangible data elements, the effect data elements and degrees of performance of the tangible data elements; and, storing the descriptive data elements of the information as a third set in the fixed medium.

The method can further comprise the steps of: linking each the tangible data element to each the effect data element partially or, wholly caused by the tangible data element; and, linking each the effect element to each the tangible data element required for the effect to occur.

The method can still further comprise the step of storing all the data elements in hierarchal structures of parent-child relationships.

A method for establishing and managing a database, in accordance with yet another inventive arrangement, comprises the steps of: storing a database in a fixed medium; dividing the database into a set of tangible data elements representing things which have physical weight and can cause an effect and a set of intangible data elements representing words and concepts which have no physical weight and cannot be weighed; dividing the set of intangible data elements into a first subset of effect data elements representing verbs, standing alone and in combination with other words, which describe actions, objectives, results, missions, procedures and processes, and a second subset of descriptive data elements describing the tangible data elements, the effect data elements and degrees of performance of the tangible data elements; and, automatically classifying and storing words entered into the database according to the sets and subsets of data elements.

The method can further comprise the step of automatically categorizing the words into one of tangible data, effect data, descriptor data and other data.

A method for inter-relating different databases structured as described above, in accordance with yet another inventive arrangement, comprises the steps of: for each of the databases, and in any order, normalizing names of like data elements having different names in the different databases and normalizing names of different data elements having like names in the different databases; normalizing data elements which are separate in any one of the databases and which are grouped together as single data elements in any other of the databases; comparing each of the normalized databases with each other one of the normalized databases; recording all common data elements found during each the comparing step; and, recording one location of each the common data element in each of the databases.

A method for integrating heterogeneous database structures, corresponding to the hierarchal form of the databases described above, in accordance with yet another inventive arrangement, comprises the steps of: proceeding with the integrating if respective top level data elements in the heterogeneous databases and the parts thereof are substantially the same or differentiated only by descriptors; for each of the database structures, and in any order, normalizing names of like data elements having different names in the different databases and normalizing names of different data elements having like names in the different databases; normalizing data elements which are separate in any one of the database structures and which are grouped together as single data elements in any other of the database structures; selecting one of the database structures to be an integrated database structure; relocating all data elements in all substructures of the remaining database structures into the integrated database structure, downwardly level by level in the hierarchal form; and, recording each new and old location of each the relocated data element as a cross reference.

BRIEF DESCRIPTION OF THE DRAWINGS

The presently preferred embodiments of the inventive arrangements are hereafter described with specific reference to the following figures.

FIGS. 3(a), 3(b) and 3(c) show three types of hierarchical structures.

FIGS. 6(a) and 6(b) show the three dimensional aspect of cause and effect structures when descriptor slices are included.

FIGS. 9(a), 9(b) and 9(c) show the coding technique.

DETAILED DESCRIPTION OF THE PREFERRED EMBODIMENT

The description of the inventive arrangements is divided into sections for convenience. These sections include the MINDBASE Database Rules, Description of Terms, Sample Cause and Effect Structures, Descriptor Display in Cause and Effect Structures, Sample Cause-Effect Structures, the Coding Technique, Data Element Storage for Multiple Uses, the Dictionary Structure, the Dictionary Technique, Building Organizational Structures, Integrating Heterogeneous Databases In Different Languages, the Inter-Relation Technique, the First Integration Technique, the Second Integration Technique, the Third Integration Technique, the Fourth Integration Technique, Arranging Tree Structures for Display, Scrolling Large Tree Structures and the Level by Level Search Process.

The MINDBASE Rules

Figures are used to help describe the following set of MINDBASE database rules. The graphical representations of the rules in the figures are for clarification and example only and do not represent the only ways to display, interpret, or use the rules.

The MINDBASE system is a complete database management system that includes techniques for categorizing data elements, a format for storing data elements, a MINDBASE dictionary technique for automating the use of MINDBASE, routines for inter-relating and integrating data structures, routines for searching MINDBASE structures and routines for displaying and scrolling MINDBASE structures on a display device.

Figure 1A:
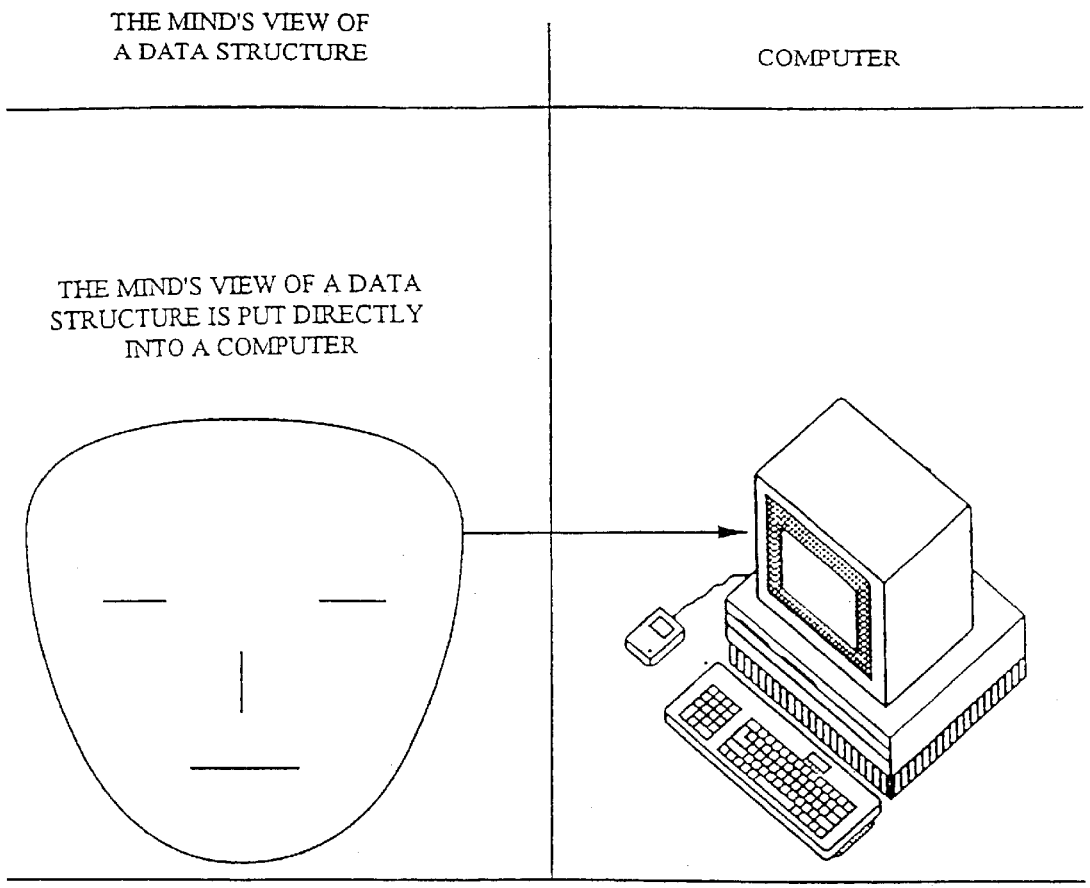
FIGS. 1(a) and 1(b) are useful for explaining how the MINDBASE system is an extension of the computer.
Figure 1B:
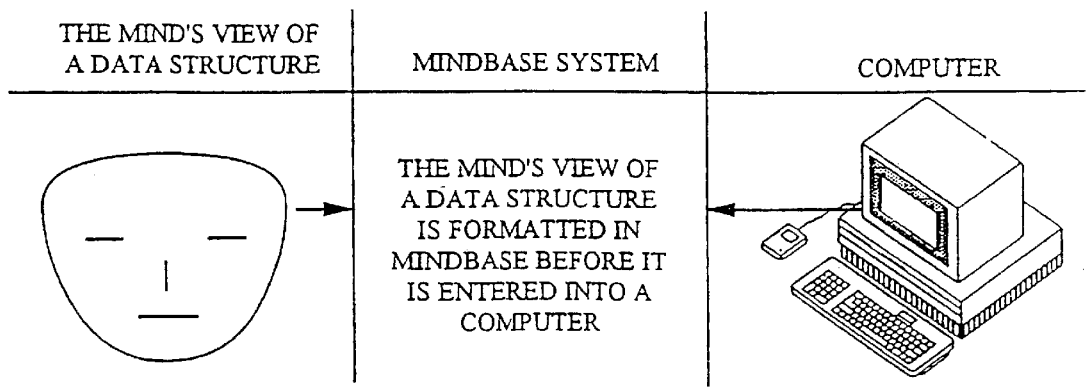
Figure 2A:
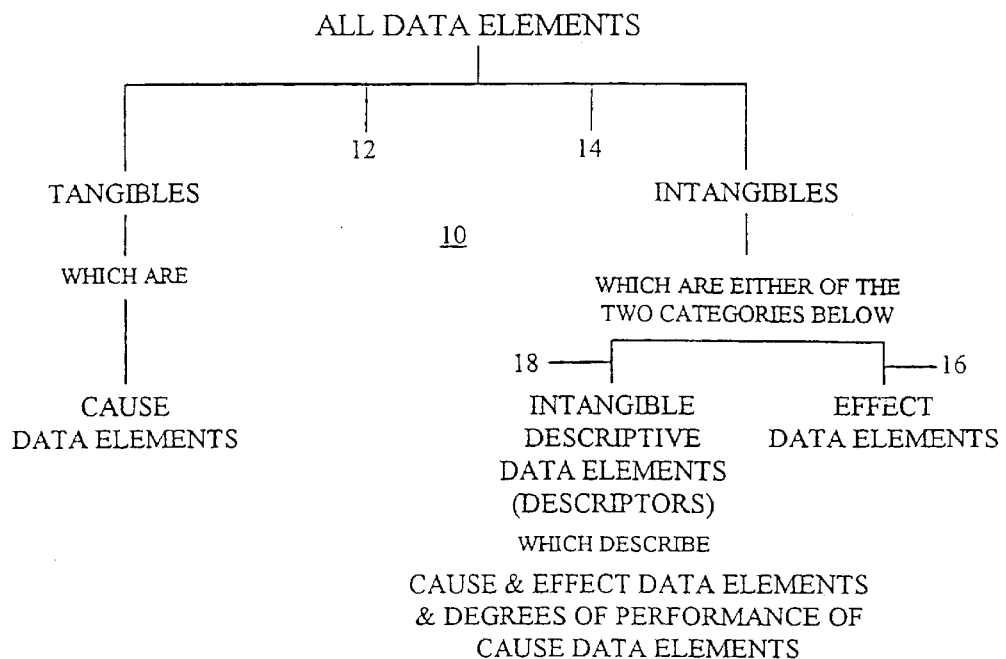
FIGS. 2(a), 2(b) and 2(c) are useful for explaining the difference between cause data elements, effect data elements and descriptor data elements.
Figure 2B:
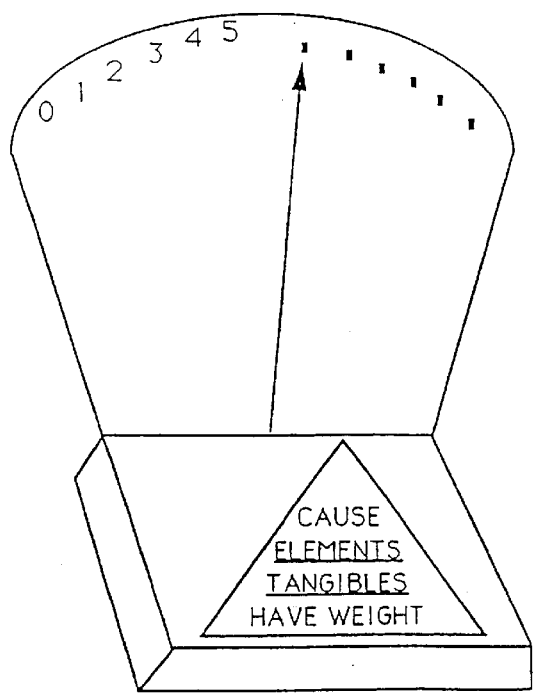
Figure 2C:
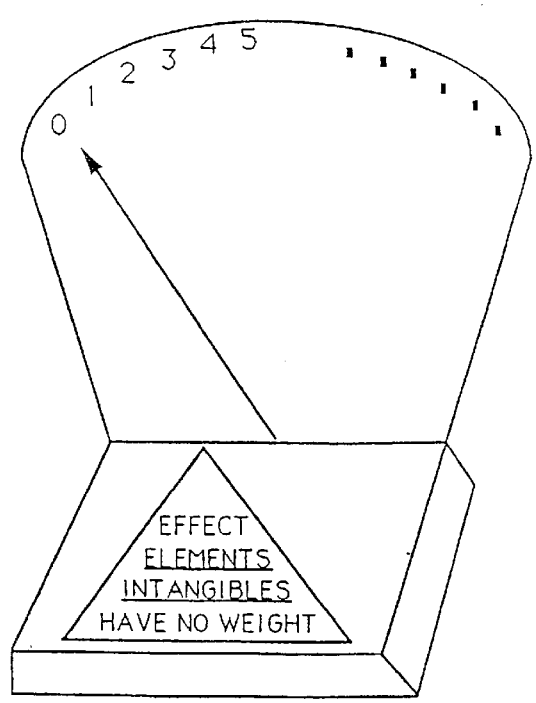

The MINDBASE system divides all data elements into two categories, tangible and intangible, as shown by the tree structure 10 in FIG. 2(a). Tangible data elements on branch 12 are defined as those data elements that refer to things that have physical weight and can be weighed on a scale, as shown by the scale FIG. 2(b). Tangible data elements on branch 12 are called "cause" data elements. Intangible data elements are all of the other data elements that refer to things that do not have weight, as shown by the scale in FIG. 2(c). Intangible data elements are subdivided into two categories, "effect" data elements on branch 16 and "descriptors" on branch 18. Cause data elements are referred to as "causes." and effect data elements are referred to as "effects." Effects are verbs that either stand alone or are combined with other words. Effects describe actions, objectives, results, missions, procedures, or processes. Descriptors are used to describe either cause elements, effect elements, or the degree of performance of cause elements.

All data is stored in hierarchical structures which can take many forms for purposes of organization and display. FIG. 3(a) shows a tree structure 30. FIG. 3(b) shows an outline structure 32. FIG. 3(c) shows a table structure 34. Other structures can also be utilized.

Each type of hierarchy, or hierarchal structure, is storing the same hierarchical information. One way of storing cause and effect data elements is in separate hierarchical structures. The structures are identified as "cause structures" or "effect structures" depending on which type of element they contain. Cause data elements are stored in cause structures. A verb with other words is used to identify effect data elements in effect structures. Descriptors can be attached to a cause element in a cause structure to describe a cause data element. Descriptors can be attached to a cause-effect link to describe the degree of performance of the cause element in the cause-effect relationship. Descriptors can be attached to an effect that is attached to a cause element and describes how the descriptor identified the cause element. Descriptor storage is more completely described in the section named "Descriptor Display in Cause and Effect Structures." A second way of storing causes and effects is by storing them in the same structure which is called a "Cause-Effect" structure. Verbs only are used as effects in cause-effect structures. Cause structures and effect structures are described in the section named "Sample Cause and Effect Structures." Cause-Effect structures are described in the section named "Sample Cause-Effect Structures."

All cause elements are linked to the effect elements that they either partially or wholly make happen. All effect elements are linked to the cause elements that are required to make them happen. Each cause element must perform to a specific degree of performance in each of its cause-effect relationships. This degree of performance can be recorded in different ways. One way to record a degree of performance is to make it a descriptor of the effect element to which cause elements are linked. Another way it can be stored is to attach it to the link between a cause and an effect. An example is "The tall man drove the car 50 miles per hour." "Man" and "car" are tangible cause elements because they have weight. The effect can be "drove" or "drove the car." "Tall" is a descriptor that describes "mar." "50 miles per hour" is a descriptor that can describe "drove." "50 miles per hour" can also describe the degree of performance of the cause elements "man" and "car" in the cause-effect relationship between "man," "car," and "drove" (or "drove the car).

MINDBASE databases can be structured with descriptors being stored in the following ways. Descriptors can be attached to cause-effect links and also to causes. Descriptors can be attached to cause-effect links and also to effects that are attached to causes. In the latter use the effect describes how the descriptor identifies the cause. Descriptors can be attached only to cause-effect links.

All cause and effect data elements and descriptors are stored only once in MINDBASE regardless of how many times they appear in cause, effect and cause-effect structures or of how much they are differentiated by descriptors in different locations. For example, the cause element "cake" can be located twice in one structure with descriptors describing one location as a "round, chocolate cake" and the other location as a "square, sponge cake." "Cake" can also be located in another structure as a "round, spice cake." The computer stores only one location of the cause element "cake.". The other locations of "cake" in both structures are connected to the single location where "cake" is stored. The computer stores only one location of the descriptor "round." Both locations of "round" cake are connected to it. This rule applies to all MINDBASE structures that are constructed by a user or by the MINDBASE Integration Technique described hereinafter. All MINDBASE structures appear on display devices with the multiple locations of data elements wherever a user or. the MINDBASE Integration Technique has located them. However, a MINDBASE structure internally stores multiple locations of all cause and effect data elements and descriptors only once.

If a cause data element has children, then it cannot have less than two children data elements. A parent effect element can have any number of children data elements.

The MINDBASE rules also encompass the inter-relation technique, the first integration technique, the second integration technique, the third integration technique, the fourth integration technique, arranging tree structures for display, scrolling an indeterminable large tree structure on a display device and the level by level search process, which are explained in detail hereinafter.

Description of the Terms not Described Elsewhere

Data elements that are connected to a data element on the next higher level of a hierarchy are known as "children" of the data element that is on the next higher level to which they are connected. In each of FIGS. 3(a), 3(b) and 3(c) data elements B and C are children of data element A. Data elements D and E are children of data element B. Data element A is the "parent" of data elements B and C. Data element B is the parent of data elements D and E. Data elements that are on the same level and are connected to the same parent are known as "sibling" data elements. Data elements B and C are sibling data elements, and data elements D and E are sibling data elements.

The term "hierarchy" is used to describe a data element and all of the data elements that are in a lineage beneath the data element down to the lowest level of the data element's lineage. The hierarchy of data element B includes data elements B, D, E, H, and I. "Cause hierarchies" are found only in cause structures, and "effect hierarchies" are found only in effect structures. The term "substructure" is used to describe all of the data elements that are in a lineage beneath a particular data element down to the lowest level of the data element's lineage. This includes all children of a data element, all of the children's children, and all data elements continuing in this same manner down to the lowest level of the data element's lineage. The substructure of data element B includes data elements D, E, H, and I.

Sample Cause and Effect Structures

Figure 4:
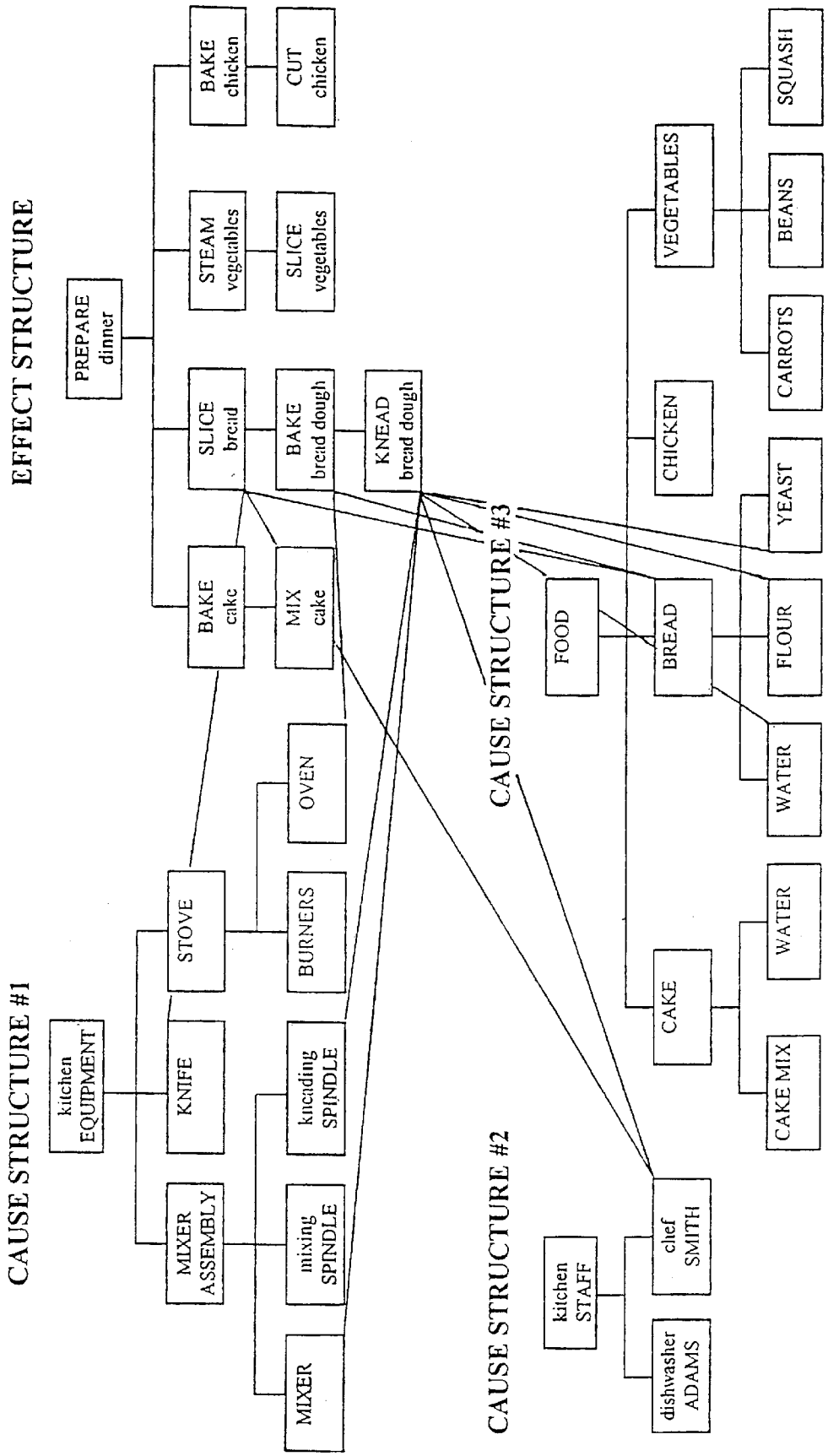
FIG. 4 shows sample cause and effect structures with relationships between cause and effect data elements.

Sample cause and effect structures are shown in FIG. 4. Cause structures #1, #2 and #3 are linked to the same effect structure. All of the data elements in the cause structures refer to things that have weight. All of the data elements in the effect structure are effect verbs in combination with the names of the cause elements to which they are linked. An identifying technique can be used to differentiate the effect verbs and cause data elements. For example, the effect verbs can be in upper case, and the names of the cause elements to which they are linked can be in lower case. To bring about any particular effect requires all of the cause elements that are linked to the effect element to perform to a specific degree of performance. Any data element in the cause or effect structures can have an unlimited number of links. The degree of performance is described by the descriptors that apply to the effect element. Descriptors are described in the next section.

In FIG. 4 the links are drawn for each data element in the "slice bread" hierarchy of the effect data structure. Links for the other cause-effect relationships are not shown for sake of clarity. The process of kneading bread dough is represented by linking the effect element "knead dough" to the cause elements "chef Smith," "flour," "water," and "yeast." The process of baking the bread dough is represented by linking the effect element "bake bread dough" to the cause elements "bread dough" and "oven." The process of slicing the bread is represented by linking the effect element "slice bread" with the cause elements "chef Smith," "knife," and "bread."

It is possible to follow the links from cause data elements to determine what effect data elements they make happen. It is also possible to follow the links from effect data elements to determine what cause elements are necessary to make them happen. It is possible to follow the links and hierarchy lines from any data element in the cause and effect hierarchies to any other data element in the cause and effect hierarchies.

Descriptor Display in Cause and Effect Structures

Descriptors are intangible elements that are used (1) to describe cause data elements; (2) to describe effect data elements; and, (3) to describe the degrees of performance of cause elements in cause-effect links.

Figure 5:
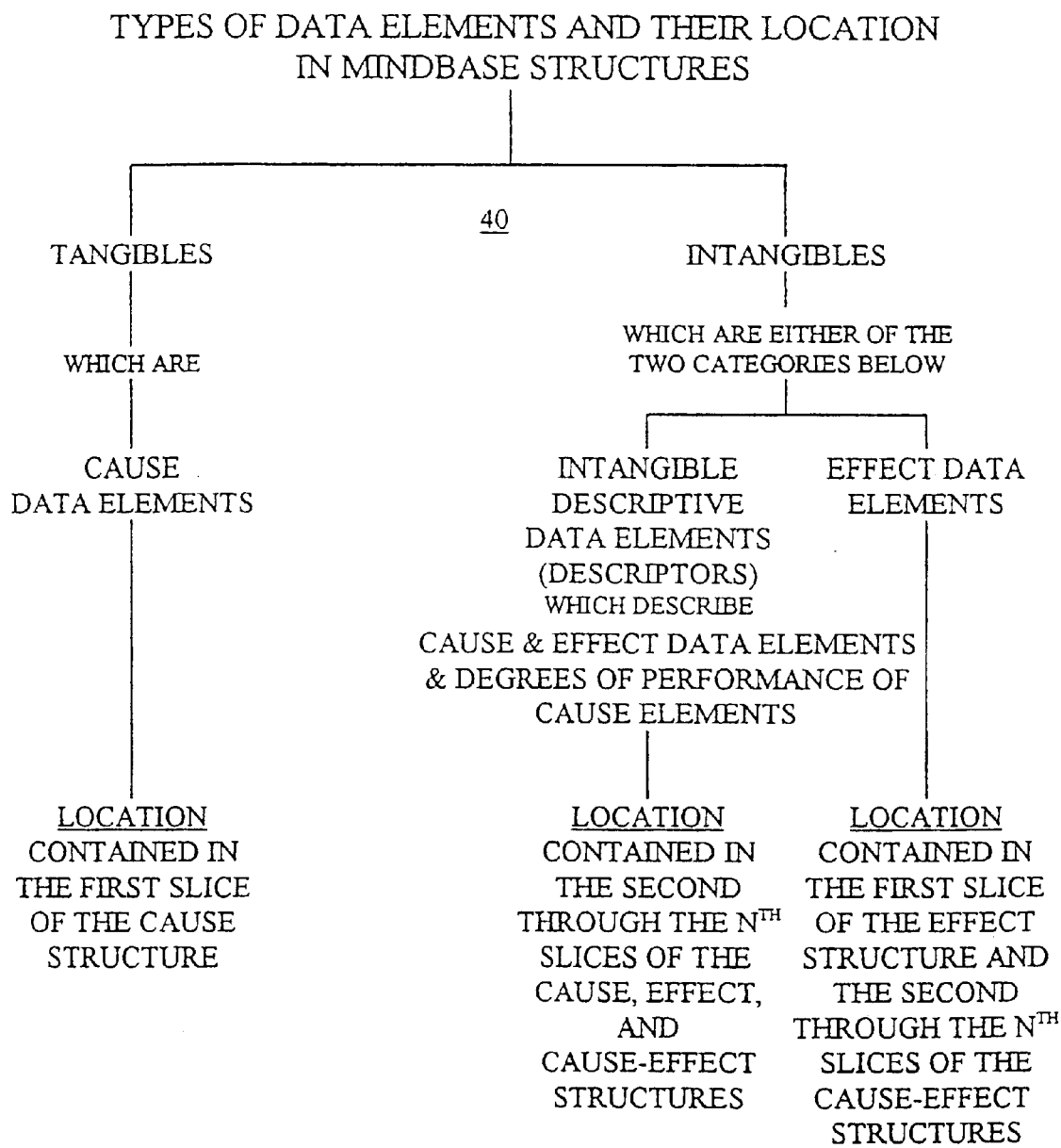
FIG. 5 shows the difference between cause data elements, effect data elements, and descriptors and illustrates their locations in the cause, effect, and cause-effect structures.

One way to visually display descriptors that describe cause and effect data elements is to add a third dimension to cause and effect structures. This can be done by placing identical copies of both the cause and effect structures behind the original structures. Such an arrangement is shown in the drawings, wherein the tree structure 40 in FIG. 5 is represented by the cause structure slices shown in FIG. 6(*a*) and the effect structure slices shown in FIG. 6(*b*). Each copy as well as the original cause and effect structures are called "slices." The original cause and effect structures are the first slice in their respective structures. Every slice behind the first slice represents a single descriptor. Each cause and effect data element in the first slice of their respective structures now has data element locations directly behind it in each of the descriptor slices. Every descriptor slice represents the potential of applying that descriptor to every cause or effect data element in the first slice.

Figure 6A:
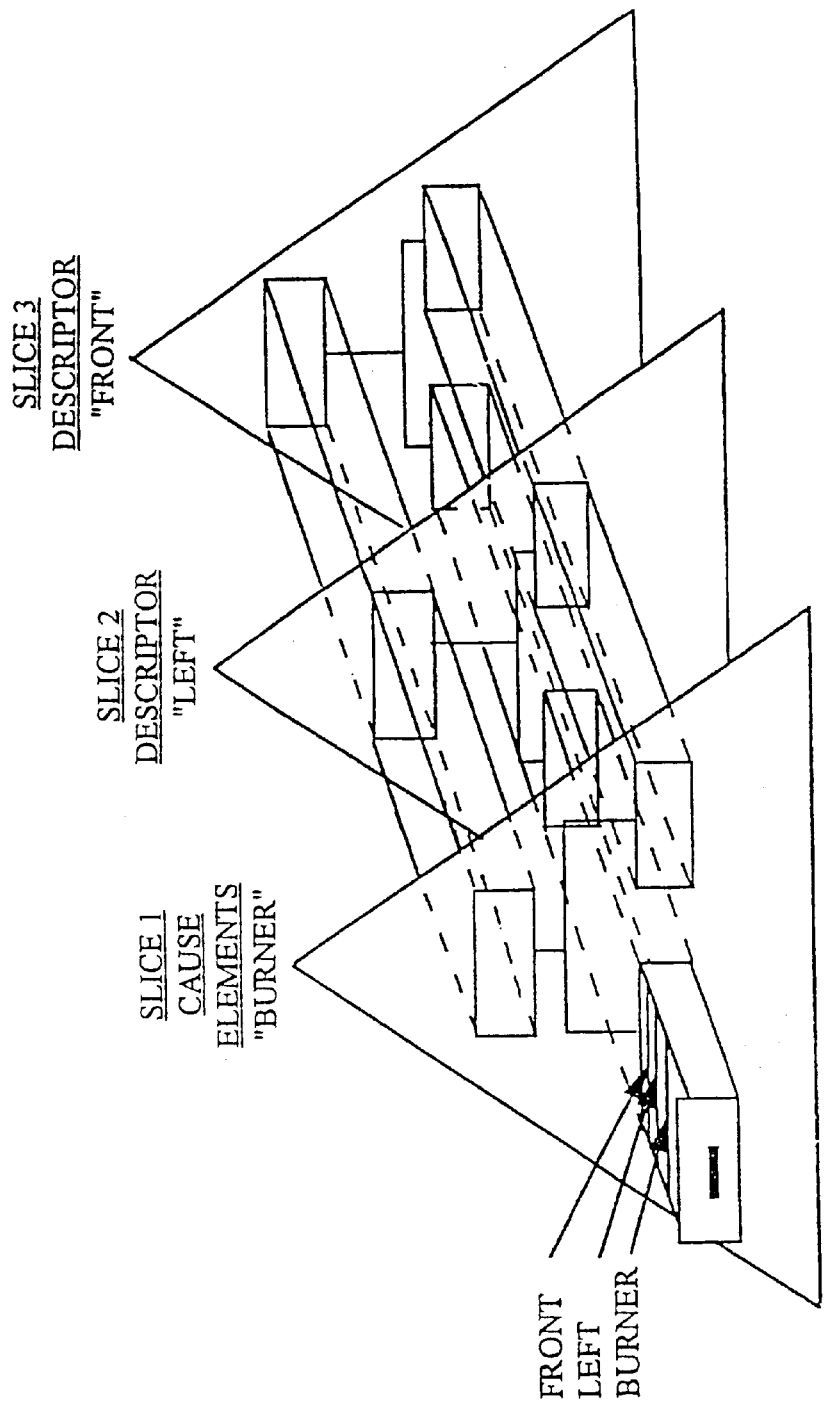

If the first slice's descriptor is needed to describe a cause or effect data element, then the descriptor is placed in the first slice's data element box that is directly behind the cause or effect element. Only when a cause or effect data element requires a particular descriptor to describe it will the descriptor slice's data element box that is directly behind the cause or effect data element have the descriptor in it. In FIG. 6(*a*) descriptor slices apply the words "left" and "front" to the cause element "burner." Descriptor slices also apply "350" and "degrees" to the effect element "bake cake" in FIG. 6(*b*).

Figure 7:
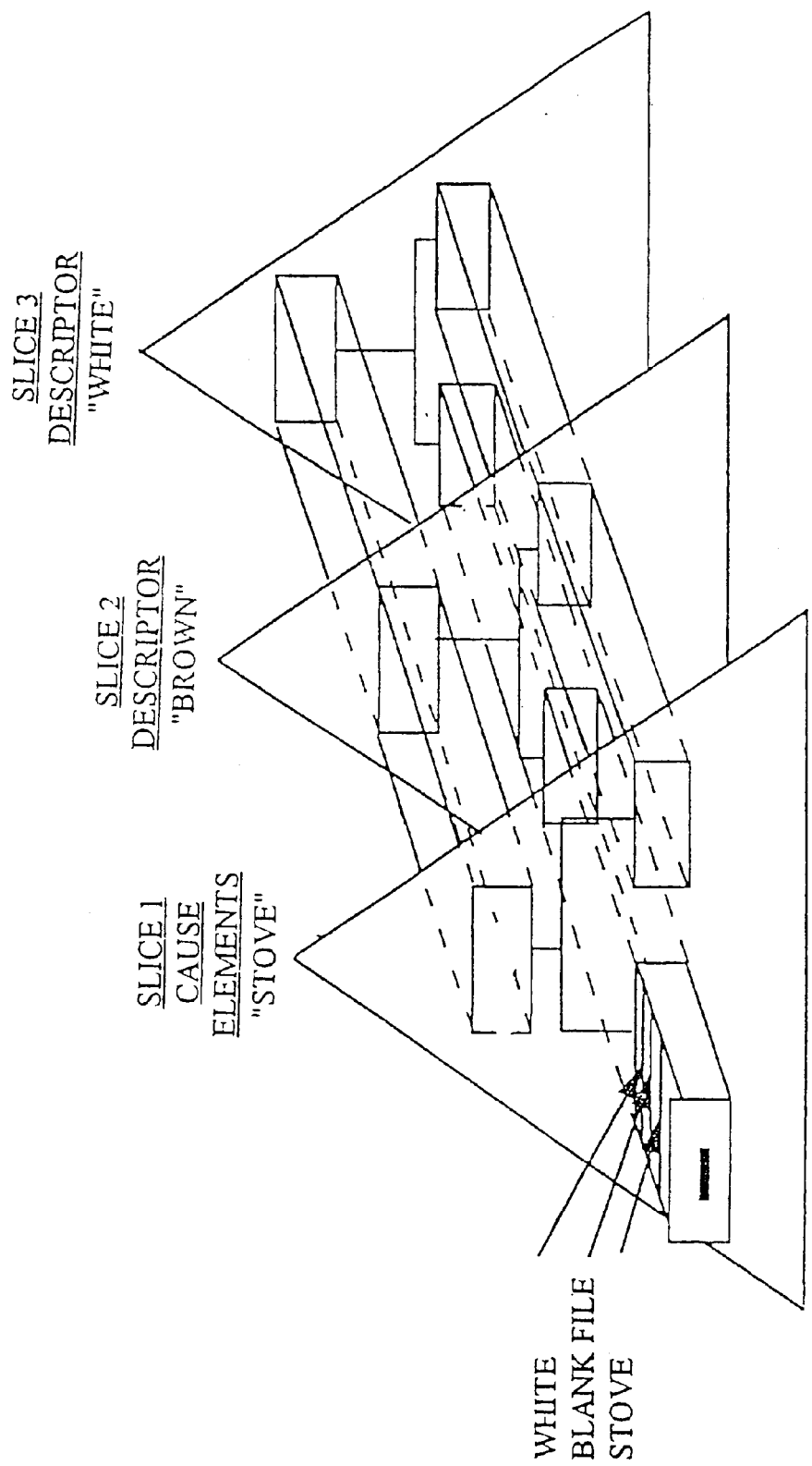
FIG. 7 shows both the use and non use of descriptors.

Any cause or effect data element in the first slice and the descriptor data elements behind it can be thought of, and represented as, a file drawer that can be pulled out of the three dimensional MINDBASE structure. The first file in the file drawer is the name of the cause or effect data element that is in the first slice. The data element locations in each slice behind the first slice are like files in the file drawer. If a descriptor applies to the cause or effect in the first slice, then the file that represents that descriptor contains the descriptor. If a descriptor does not apply to the cause or effect element in the first slice, then the file that represents that descriptor is blank. In FIG. 7 the cause element "stove" is colored white. Therefore the data element box or file from the "brown" descriptor slice is blank, and the data element box or file from the "white" descriptor slice contains the word "white."

Slices are used as a graphical representation to display how descriptors have the potential for being applied to all cause and effect data elements. Any programming procedure that accomplishes this potential use can be used.

Instead of applying a descriptor to an effect data element, it can be applied to the cause-effect link between a cause data element and an effect data element. In the above example, the cause elements "oven" and "cake" have individual links to the effect element "BAKE cake," to form a complete cause-effect link relationship that represented "baking a cake in the oven." The descriptors "350" and "degrees" could be attached to the link between "oven" and "BAKE cake" to describe the degree of performance of the "oven."

Individual cause data elements will always have the same descriptors. A "red" car is always "red." A "tall" man is always "tall," and a "short" man is always "short." However effect data elements can have different descriptors in different cause-effect relationships. In the cause-effect relationship, "The tall man drove the red car 30 mph," the degree of performance that describes the effect, "drove," is "30 mph." In the cause-effect relationship, "The tall man drove the red car 50 mph," the degree of performance that describes the effect, "drove," is "50 mph." In both relationships the descriptors that describe the effect data element "drove" are different, however the same descriptors "tall" and "red" describe the cause data elements "man" and "car" respectively in both cause-effect relationships. "30 mph" and "50 mph" can also be applied to the cause-effect link between "man" and "drove."

An effect, its descriptors and all of the cause elements for which the descriptors serve as a degree of performance are linked in a relationship. When the descriptors of an effect element are listed on a display device or printout, all of the cause elements that are in a relationship with the descriptors must be capable of being listed with each descriptor.

The MINDBASE dictionary routine mentioned earlier helps classify all words as causes, effects, descriptors and others. This routine automatically insures that users input words properly. It also helps when users leave out descriptive information that is necessary to properly build a MINDBASE structure. The MINDBASE system is able to avoid the problems of "verbal shorthand" whereby users leave out descriptive details in their communications.

Sample Cause-effect Structures

One method of displaying cause-effect structures is to have both the descriptors and verbs that are used as effects represented in slices behind the first slice. If an effect verb is in a relationship with a cause element, the effect verb is placed in that effect verb slice's data element box that is directly behind the cause element. A descriptor that applies to either a cause or effect element is placed in that descriptor slice's data element box that is directly behind the cause or effect element.

Figure 8:
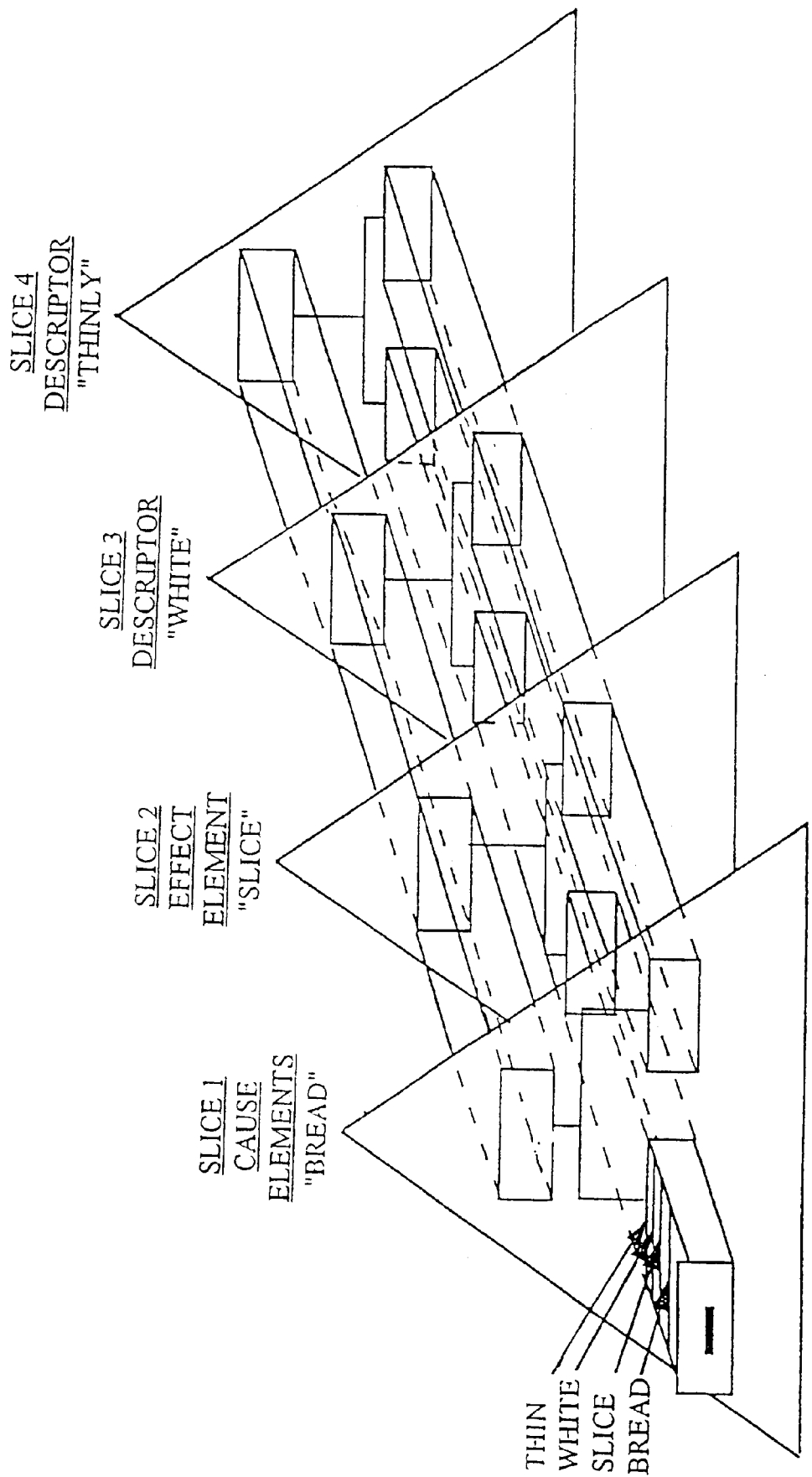
FIG. 8 shows a sample cause-effect structure.

Any cause element in the first slice and the effect elements and descriptors behind it can be thought of and represented as a file drawer that can be pulled out of the three dimensional MINDBASE structure. FIG. 8 represents part of the relationship "Chef Smith thinly slices the white bread with a serrated knife." "Chef Smith" and "knife" are not displayed in FIG. 8 due to graphical limitations. The cause element shown is "bread." The descriptor element "white" describes the bread. The effect element is "slice." The descriptor element "thinly" describes the effect "slice." If the cause elements "Chef smith" and "knife" were shown in FIG. 8, they would also have the effect element "slice" and its descriptor, "thinly," behind them in their respective slices. "Knife" also would have the descriptor "serrated" behind it in a slice. A complete cause-effect relationship is formed by having the cause elements "Chef Smith" "knife," and "bread" linked to the effect element "slice."

"Thinly" must be linked to "slice" because it is a descriptor of "slice." "Thinly" must also be linked to the cause elements "Chef Smith," "bread," and "knife" because it is the degree of performance of these cause elements. "Thinly's" link to these cause elements must be in a cause-effect relationship. An effect descriptor and all of the cause elements for which it serves as a degree of performance are linked in a relationship. When the descriptors of an effect element are listed on a display device or printout, all of the cause elements that are linked to the descriptor in a relationship must be listed with each descriptor.

Slices are used as a graphical representation to display how descriptors have the potential for being applied to all cause and effect data elements. Any programming procedure that accomplishes this potential use can be used.

The Coding Technique

The MINDBASE coding technique is a procedure for identifying and displaying any MINDBASE structure of unlimited size that is stored in computer memory. The versatility of the MINDBASE system allows a choice of alphabetic, numeric, or other types of symbols to accomplish this task. The MINDBASE coding technique contains the following required information for each data element in the first slice of a MINDBASE structure: (1) the identification of the MINDBASE structure in which the data element is stored; (2) the level within the MINDBASE structure on which the data element is located; (3) the location of the data element on its level; (4) the hierarchy of the data element that extends from the data element up to the top level data element; and, (5) when descriptors have been assigned to cause or effect data elements, the descriptors can also be contained in each data element's code. Individual cause data elements will always have the same descriptors. However, individual effect data elements can have different descriptors for each cause-effect relationship they are in. Effect data elements' descriptors represent the degree of performance of the cause elements in each individual cause-effect relationship.

One embodiment of the MINDBASE coding technique uses a code group for each individual data element that is in the first slice of cause, effect, or cause-effect structures. MINDBASE code groups in this embodiment have two parts in cause and effect structures. One part contains the first four of the above requirements for each data element in the first slice of cause and effect structures. The other part contains the fifth requirement listed above.

MINDBASE code groups in this embodiment have several parts in cause-effect structures. One part contains the first four of the above requirements for each data element in the first slice of the cause-effect structures. Another part contains the fifth requirement for the cause elements in the first slice. When a cause element in the first slice is linked to an effect element in another slice, the code for the effect slice is contained in another part of the MINDBASE code group. Descriptors that apply to the effect that is linked to the cause element are contained in another part of the MINDBASE code group.

Each part in MINDBASE code groups in this embodiment contains an unlimited number of data fields. The user has the following choices in applying this embodiment of the MINDBASE coding technique: (1) the user can choose which part contains the first four requirements of the MINDBASE code and which part contains the fifth requirement of the MINDBASE code; (2) the user can choose what information is stored in each data field; (3) the user can choose to number data fields from left to right or right to left; (4) each data element's number as calculated in step 4 below can be from left to right or right to left; and, (5) each of the above four choices must be consistent throughout any single MINDBASE structure and throughout all MINDBASE structures that are inter-related or integrated.

In this embodiment, the part of a MINDBASE code group that contains the first four requirements of the MINDBASE coding technique are constructed by the following numbered procedure. In the following procedure, choices were made according to the above list of five choices. The choices made according to the above list are for the following example only and in no way limit the choices of individual users. (1) The first data field identifies the MINDBASE structure in which the data element is located. (2) The second data field identifies the horizontal level of the MINDBASE structure on which the data element is located. The horizontal levels of the MINDBASE structure are numbered from the top down with the top level being level one. (3) A hierarchy is identified for the data element. The hierarchy goes up from the data element to its parent, then to its parent's parent, and it continues up its lineage in the same fashion is until the single data element on the first level is reached. (4) Each data element in the data element's hierarchy is given a number by numbering from left to right the data element and all of its siblings. (5) The code for each data element includes the data element numbers for the data element itself and all of the data elements that are above it in its hierarchy. (6) The third data field contains the data element number for the level 1 data element in a data element's hierarchy. The information in the third data field is optional as it is the same for every data element. If it is omitted, then each successive data field is moved up by one number. The fourth data field contains the data element number for the level 2 data element in a data element's hierarchy. Each successive data field contains the data element number for the next lower level data element in a data element's hierarchy. The last data field contains the data element number for the data element whose code is being structured. FIG. 9(a) shows a cause structure 56. A table of corresponding sample data element hierarchies is shown in FIG. 9(b) and a corresponding table of codes is shown in FIG. 9(c).

The part of the MINDBASE code group that contains a data element's descriptors has a data field for each descriptor that applies to data element. Each descriptor's data field contains the identity of the particular descriptor.

A cause-effect relationship between cause and effect data structures can be displayed by a combination of the MINDBASE code group for an effect element along with the MINDBASE code groups for the cause elements that are linked to the effect element. A cause-effect relationship within a cause-effect structure can be displayed by a combination of the MINDBASE code groups for all of the cause elements that are linked to a single effect element.

Data Element Storage for Multiple Uses

The MINDBASE system automatically stores a data element only once in computer memory regardless of how many places the data element is located in a MINDBASE data structure. A specific rule is used to determine which one of a data element's multiple locations is used to store the data element. An example of such a rule is to store a data element at its left-most position on its highest level of appearance. Another example of such a rule is to store it at its left-most position on it lowest level of appearance. The user is free to choose one of these rules or to create other rules for determining a data element's storage position. However, the rule must be consistent throughout a MINDBASE structure and throughout all MINDBASE structures that are inter-related or integrated.

All other locations of the single data element are connected to their single storage location. These connections can be structured by alpha-numeric coding, object pointers, or any other way. This procedure is applied automatically to all data structures.

An alternative to storing each data element directly in one of its locations in a MINDBASE structure is to store all data elements outside of all MINDBASE structures. Pointers can go from data elements in this storage location to each use of the data elements within MINDBASE structures.

The Dictionary Structure

The MINDBASE dictionary is structured in accordance with the following steps or criteria: (1) every word in the MINDBASE dictionary is categorized into one of four following categories; Cause, Effect, Descriptor, or Other; (2) every word in the MINDBASE dictionary is also related to all synonyms or words that have the same meaning or convey the same thought. (i.e. fast vs. rapidly); (3) every word in the MINDBASE dictionary that has two or more different meanings is identified. (i.e. A "clock" that tells time vs. "Clock" a horse race); and, (4) all cause-effect relationships that are created by users are stored in the MINDBASE dictionary.

All information in the MINDBASE dictionary is available to users for information purposes and to support word choices and data entries.

The Dictionary Technique

The MINDBASE dictionary technique, or method, compares every word entered into a MINDBASE structure to the same word in the MINDBASE dictionary. The technique determines the following information about the entered word: (1) Each entered word is categorized as a "cause," an "effect," a "descriptor," or an "other" word; (2) Any cause, effect, or descriptor that is not entered into a cause, effect, or descriptor location respectively is identified; (3) Any entered word that is in more than one of the above categories is identified; (4) Any entered word having one or more synonyms is identified; and, (5) Whether or not the entered word or any synonym has already been used in any other MINDBASE structure in the same organization is determined.

If the user has made a mistake in number 2 above, the MINDBASE dictionary will not accept the user's entry. The user will be informed of the error and asked to make another entry. Some words appear in more than one category in the MINDBASE dictionary, and some words have more than one distinctly different meaning within the same category. When these words are entered into a MINDBASE structure or when the entered word has a synonym that is already in a MINDBASE structure, the user is questioned to determine the category and meaning desired by the user. These questions are answered by a keystroke, a click of the mouse, or a similar response.

The questions accomplish the following tasks. (1) If the entered word is in more than one of the cause, effect, descriptor, or other categories, the method shows the user the different categories. The user chooses the correct category. (2) If the entered word has more than one distinctly different meaning within the same category, the method shows the user the different meanings. The user chooses the correct meaning. (3) If the entered word has a synonym that is already in the MINDBASE structure, the method shows the user the synonym that is already in the MINDBASE structure, and asks if the user is willing to use the synonym instead of the entered word. If the user accepts the synonym, the entered word is replaced. If the user refuses to use the synonym, the method retains the synonym and also accepts the user's newly entered word. The method contacts the user who originally entered the synonym and asks if this user will accept the newly entered word as a replacement for the synonym. If this user accepts the newly entered word, the method replaces the synonym with the newly entered word. If this user rejects the newly entered word, the method allows the use of both the newly entered word and the synonym. The dictionary makes a record that associates the newly entered word and its synonym with the users who entered them. (4) The technique considers the earliest entered synonym as the Key Search Word for all data searches that relate to the synonyms. The key word in a synonym group can change if the user who entered the key word accepts a replacement synonym at a later date. All searching in MINDBASE structures is done on the key word in a synonym group. Synonyms that are not the key word are not always searched.

The dictionary, and the method represented by the dictionary, has the ability to automatically correct the improper entry of cause data elements. An example is entering "red car" as a cause element. The dictionary recognizes that "car" is a cause element. The dictionary also recognizes that "red" is a descriptor in the descriptor category named "color." The dictionary knows that descriptors in the "color" category are applied by the effects "paint," "spray," "dip," "unknown, or "other." The dictionary automatically accepts "car" as the cause element and automatically enters "red" as a descriptor from the "color" descriptor category. The dictionary asks the user to choose the effect that is the method of color application from the list "paint," "spray," "dip," "unknown," or "other." If the user chooses "other," the user is required to enter another effect. This other effect is then automatically added to the list of effects that are methods of color application.

Building Organizational Structures

Almost all organizations have recorded information about their employees, physical assets and work flow processes. This information along with the MINDBASE dictionary can be used to structure one or more basic organizational MINDBASE databases. Almost every organization has its own unique vocabulary and word usage. MINDBASE databases that are structured for the entire organization will include this unique. vocabulary and word usage. This makes the unique vocabulary and word usage available for all members of the organization when they structure division or office specific MINDBASE structures. This also insures the same unique vocabulary and word usage throughout the organization.

Most of an organization's unique vocabulary and word usage are descriptors. When descriptor tables are structured for an entire organization's use, all MINDBASE databases structured in the organization will use the same descriptor tables. This greatly facilitates the automatic integration of MINDBASE databases that are structured in the future.

If the MINDBASE system is going to be implemented in only one division of a multi-division organization, then basic organizational MINDBASE databases will probably not be structured with all of the unique vocabulary and word usage of the entire organization. Instead, division MINDBASE databases will be structured without all of the unique vocabulary and word usage of the entire organization. In the future, if the organization decides to adopt the MINDBASE system for the entire organization, it is still possible to integrate the division's MINDBASE databases with other divisions' MINDBASE databases to create MINDBASE databases for the entire organization. The unique vocabulary and word usage of the entire organization will be incorporated in the fully integrated organization MINDBASE databases. The decision on whether or not to implement the MINDBASE system for an entire organization is based on the expected needs of the organization when the MINDBASE system is initially implemented anywhere in it.

Integrating Heterogeneous Databases in Different Languages

The MINDBASE system can be used to integrate heterogeneous databases that are in different languages and also in different database technologies such as Oracle and Sybase. Two different procedures will accomplish this task.

A first procedure is implemented as follows. (1) Enter the existing databases into the MINDBASE system in their existing language. The MINDBASE system can automate this step by using interfaces between the MINDBASE system and other database technologies and by using the MINDBASE dictionary technique that includes language translators. (2) Choose a language into which the heterogeneous databases will be integrated. (3) Translate the existing foreign language MINDBASE databases into the chosen language. The MINDBASE language translator can automate this step. (4) Integrate the MINDBASE databases that are in the chosen language into a single MINDBASE database.

A second procedure can be implemented as follows. (1) Choose a language into which the heterogeneous databases will be integrated. (2) Translate the existing databases into the chosen language. The MINDBASE language translator can automate this step. (3) Enter the existing databases that are now in the chosen language into MINDBASE. MINDBASE can automate this step by using interfaces between MINDBASE and other database technologies and by using the MINDBASE dictionary technique. (5). Integrate the MINDBASE databases that are in the chosen language into a single MINDBASE database.

The first procedure allows the creators of the existing databases to work in their own language while entering their databases into the MINDBASE system. Therefore, the first procedure will usually be the preferred procedure.

The Inter-Relation Technique

The MINDBASE system can inter-relate an unlimited number of MINDBASE data structures if each one of the MINDRASE data structures shares at least one common data element with any of the other MINDBASE data structures. Multiple MINDBASE data structures are linked through data elements that they have in common. A traverse can be made from any "starting" data element in one of the inter-related structures to any desired "destination" data element in any of the other inter-related structures. The traverse goes from the starting data element in one structure along the vertical lines of its hierarchical structure and along its horizontal levels to a data element that is also in the destination data element's structure. The traverse crosses from the starting structure to the destination data element's structure through the common data element that is in both structures. Then the traverse proceeds from the common data element in the second structure along the vertical lines of its hierarchical structure and along its horizontal levels until it reaches the destination data element.

If the destination data element's data structure does not have a data element in common with the starting data structure, then the traverse must go through intermediate data structures by means of data elements that are common to two or more inter-related data structures until it reaches the destination data structure. Then the traverse goes along vertical lines of the destination data element's hierarchical structure and along the destination date element's horizontal levels, until it reaches the destination data element. The traverse procedure is optimized to use the fewest intermediary data structures as possible.

Traverses can also go along links between cause and effect structures just as they go along hierarchical lines of cause and effect structures. Therefore a traverse can be made from any cause data element in one inter-related structure to any effect data element in another inter-related structure.

Figure 16:
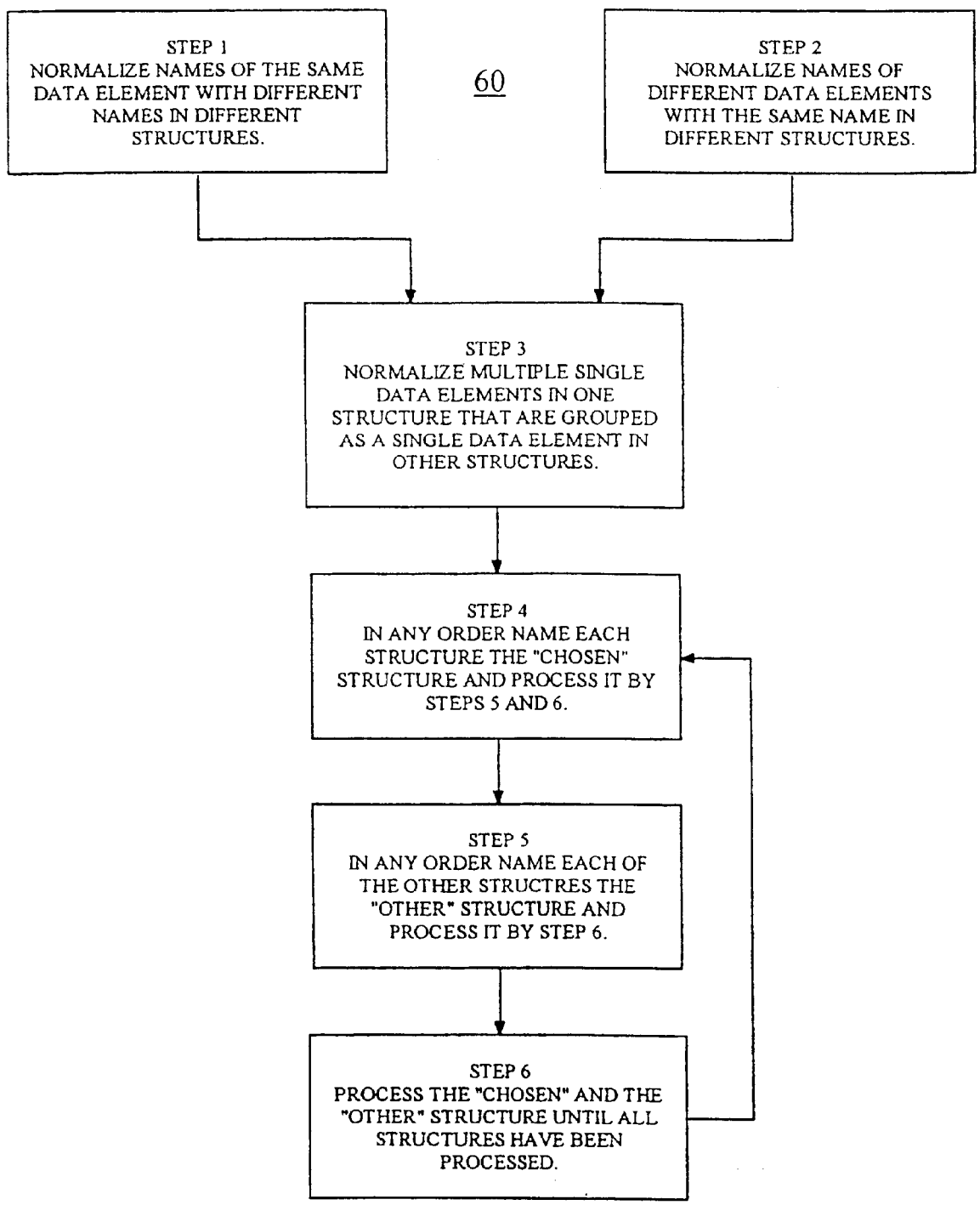
FIG. 16 shows a flowchart of the MINDBASE inter-relation technique.

The MINDBASE inter-relating technique is shown in the flow chart 60 in FIG. 16. The steps in the flow chart correspond to the following steps. Steps 1 and 2 can be performed in any order.

(1) Examine all of the MINDBASE structures that are being inter-related to determine if the same data elements in different structures have different names in different structures. Data elements can considered the same even if they are differentiated by descriptors. An example of this would be an automobile that is called a red; automobile in one structure and a green car in another structure. The computer must record the different names for the same data element in a translation table, for example in the dictionary, or by some other technique so it will recognize that the differently named data elements in different structures are actually the same data element. This is referred to as normalizing the names of the same data elements.

(2) Examine all of the MINDBASE structures that are being inter-related to determine if different data elements in different structures have the same name in different structures. An example would be using the word "vehicle" as the name of a data element that is a car in one data structure and also using "vehicle" as the name of a data element that is a truck in another data structure. The computer must record the different data elements that have the same name in different data structures in a translation table or by some other technique so it will recognize that the same named data elements in different structures are actually different data elements. This is referred to as normalizing the names of the different data elements.

(3) Examine all of the MINDBASE structures that are being inter-related to determine if two or more separate data elements in one data structure are grouped as a single data element in other structures. An example is data elements "A" and "B" in one structure being grouped together as data element "C" in another structure. When this occurs, this procedure will not recognize that "A" and "B" are the same as "C." If the user wants A and B to be recognized as the same as C, then the user must either separate C into A and B in C's data structure or join A and B in A and B's data structure to make C. This is referred to as normalizing multiple single data elements.

(4) In any order, choose each of the MINDBASE data structures that are to be inter-related and name it the "chosen" structure. Process each "chosen" structure by steps 5 and 6 below. After all of the MINDBASE data structures that are to be inter-related have been processed as the "chosen" structure, the inter-relation technique is finished.

(5) In any order, choose each of the other MINDBASE data structures that are to be inter-related and name it the "other" structure. Process each "other" structure by step 6 below. After all of the other structures have been processed as in step 6 below, go to step 4. When the second through the nth data structure is being processed as the "chosen" structure, do not process it with an "other" structure if the two structures have been previously processed as the "chosen" and the "other" structure in a previous iteration of step 4 above.

(6) Process the "chosen" structure and the "other" structure by comparing each data element in the "chosen" structure with each data element in the "other" structure to determine if each data element in the "chosen" structure is also in the "other" structure. The data elements in both structures can be compared in any order. If a data element has multiple locations in the chosen data structure, process only one of these locations. When processing each data element, use the translation table in steps one and two above to recognize the same data element with different names and different data elements with the same name. For each data element that is found in both data structures, record the name and location of the data element in each structure in an "inter-relation" table or by some other technique. If a data element in the chosen structure has multiple locations in the other structure, record only a single location of the data element in the other structure. Because the MINDBASE system automatically links all locations of the same data elements in each MINDBASE structure, recording a single location of a data element in each structure causes a search for that data element to go to all other locations of that data element in both structures.

Integration Technique #1. for Single Parent Data Elements

The MINDBASE system can completely integrate two heterogeneous MINDBASE structures into a single MINDBASE structure if the top level data element in each structure is substantially the same or differentiated only by descriptors. For example, an automobile and a tractor would not be substantially the same, but an automobile and a sports car would be substantially the same.

A sub-structure of a larger structure can be integrated with another structure or sub-structure in another structure if the sub-structure has the same parent as the other structure or the same parent as the sub-structure in the other structure. The integrated structure or sub-structure retains all of the parent-child relationships that were in the two separate structures or sub-structures. The integrated structure or sub-structure also retains all of the cause-effect relationships that the data elements had when they were in the two separate structures or sub-structures. By making successive integrations of two structures or sub-structures, an unlimited number of heterogeneous structures or sub-structures can be integrated.

Figure 17:
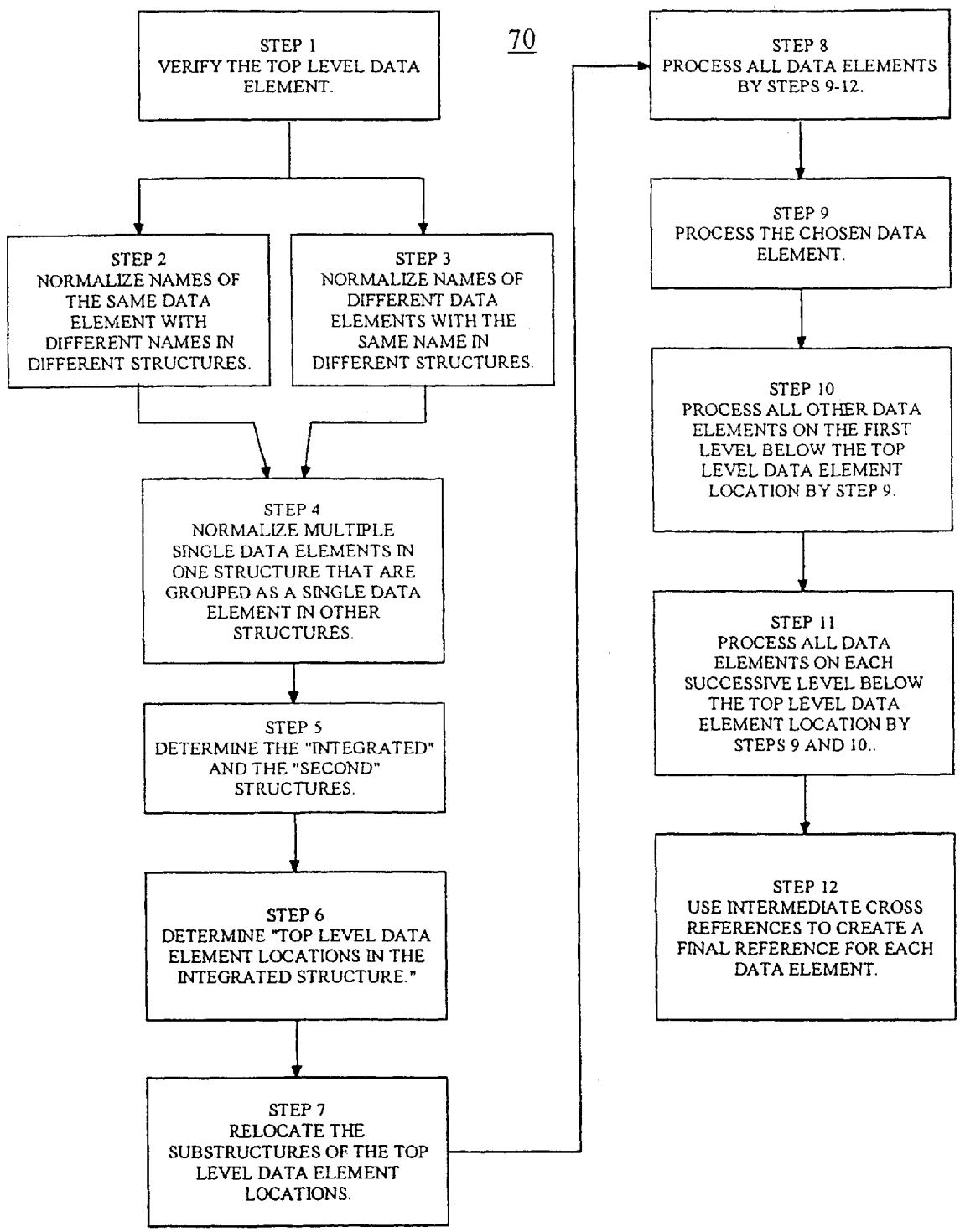
FIG. 17 shows a flowchart of the MINDBASE integration technique #1.

The MINDBASE integration technique #1, used to integrate two heterogeneous data structures is shown in flow chart 70 in FIG. 17. The steps in the flow chart correspond to the following steps. Steps 2 and 3 can be performed in any order.

(1) Verify that the top level data element of one of the two MINDBASE structures that are to be integrated is located in the other MINDBASE structure.

(2) Examine the MINDBASE structures that are being integrated to determine if any data elements in the structures are the same but have different names in the different structures. Data elements can be considered the same even if they are differentiated by descriptors. The same name is given to all locations of the same data element in the structures that are being integrated. An example of this would be an automobile that is called a red automobile in the integrated structure and a green car in the second structure. One name is chosen for the data elements "automobile" and "car" and that name is given to all locations of automobile and car in the structures that are being integrated. If a data element's name is changed in any structure that is being integrated, the changed name is cross-referenced to its original name in the original structure.

(3) Examine the MINDRASE structures that are being integrated to determine if different data elements in different structures have the same name in different structures. An example would be using the word "vehicle" as the name of a data element that is a car in one data structure and also using "vehicle" as the name of a data element that is a truck in another data structure. A different name must be given to one of the two different data elements in the different structures. If a data element's name is changed in any structure that is being integrated, the changed name is cross-referenced to its original name in the original structure.

(4) Examine the MINDBASE structures that are being integrated to determine if two or more separate data elements in one data structure are grouped as a single data element in other structures. An example is data elements "A" and "B" in one structure being grouped together as data element "C" in another structure. When this occurs, this procedure will not recognize that "A" and "B" are the same as "C." If the user wants A and B to be recognized as the same as C, then the user must either separate C into A and B in C's data structure or join A and B in A and B's data structure to make C. The separated data elements must be cross-referenced to the combined data element in the original structure, and the joined data element must be cross-referenced to the separated data elements in the original structure.

(5) Make a copy of both MINDBASE structures that are to be integrated. If top level data elements of the two structures are the same, name either of the copies the "integrated" structure and name the other copy the "second" structure. If the top level data elements of the two structures are not the same, then the copy of the MINDBASE structure whose top level data element is located below the top level data element of the other structure is identified as the "second" structure. The copy of the other MINDBASE structure is called the "integrated" structure.

(6) Locate all data elements in the integrated structure that are the same as the top level data element in the second structure. Name these data element locations in the integrated structure "top level data element locations."

(7) Under each of the "top level data element locations" in the integrated structure place the substructure of the top level data element of the second structure. Record a cross-reference for each data element is moved to the integrated structure. The cross-reference must relate the data element's new position in the integrated structure to its previous position in the second structure.

(8) Process all "top level data element locations" in the integrated structure by steps 9 through 12.

(9) Choose any data element on the first level below the "top level data element location" in the integrated structure. Identify this data element as the chosen data element and name its location the "first location of the chosen data element." If the chosen data element appears in other locations in the substructure of the "top level data element location," place the substructure of the "first location of the chosen data element" under the other locations of the chosen data element. Regardless of whether or not the first location of the chosen data element has a substructure, if the chosen data element appears in other locations in the substructure of the "top level data element location," remove the "first location of the chosen data element" from the structure that results from this step of the integration process. Record a cross-reference for each data element that is moved in this step. The cross-reference must relate the data element's position after being moved to its position before being moved.

(10) Process all other data elements on the first level below the top level data element location by the process in step 9 above.

(11) Process all data elements on each successive level below the top level data element location by the processes in steps 9 and 10 above. For the purpose of this step only, the words "first level" in the first sentence of steps 9 and 10 are replaced with "next successive level." Process all data elements on each level before proceeding to the next successive level.

(12) Use the intermediate cross-references in all previous steps to create a final reference that relates each data element in the final step of the integration process to its location in its original hierarchy.

The above steps 1–12 can be used successively to integrate an unlimited number of heterogeneous MINDBASE data structures if the top level data element of each successive data structure is found anywhere in the previous integrated structure. Integrated structures can be used to completely integrate all activities of the individual heterogeneous structures that were integrated. When activities are done in one of the structures that were integrated, the integrated structure can be used to integrate those activities into all of the other structures that were integrated Since the integrated structure has all of the parent-child relationships and the cause-effect relationships of the individual structures, it can be used in place of the original structures.

The integrated structures that result from integrating two or more heterogeneous data structures are automatically treated as any other MINDBASE structure. MINDBASE will automatically store multiple locations of the same data element at a single location as was explained in step 6 of the MINDBASE rules. MINDBASE will code the integrated structures as it would any other MINDBASE structure.

Figure 10A:
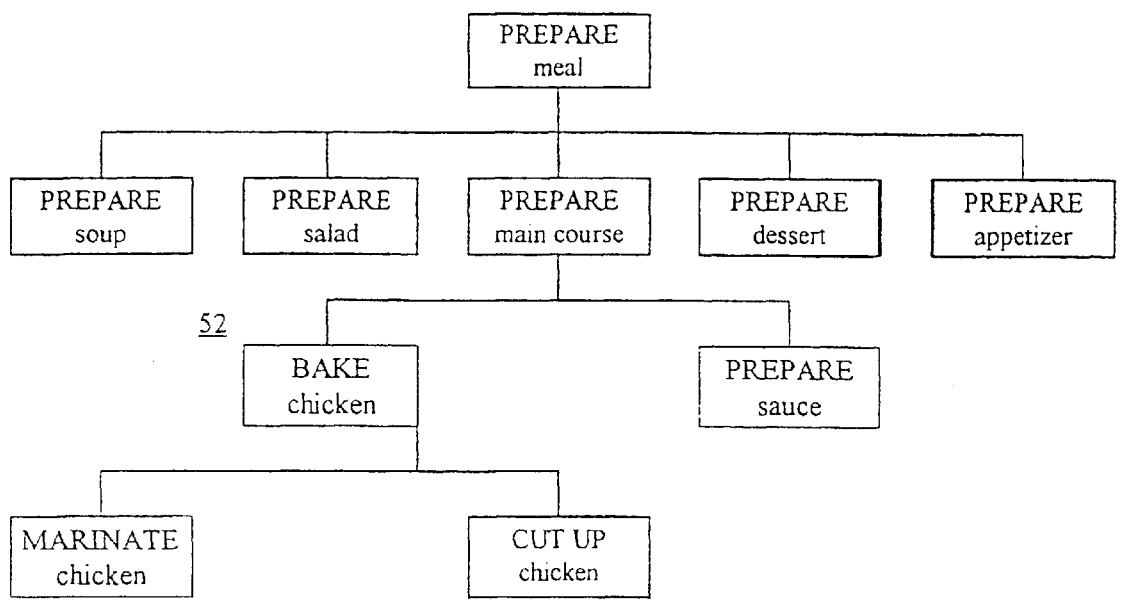
FIGS. 10(a) and 10(b) show structures that are going to be integrated.
Figure 10B:
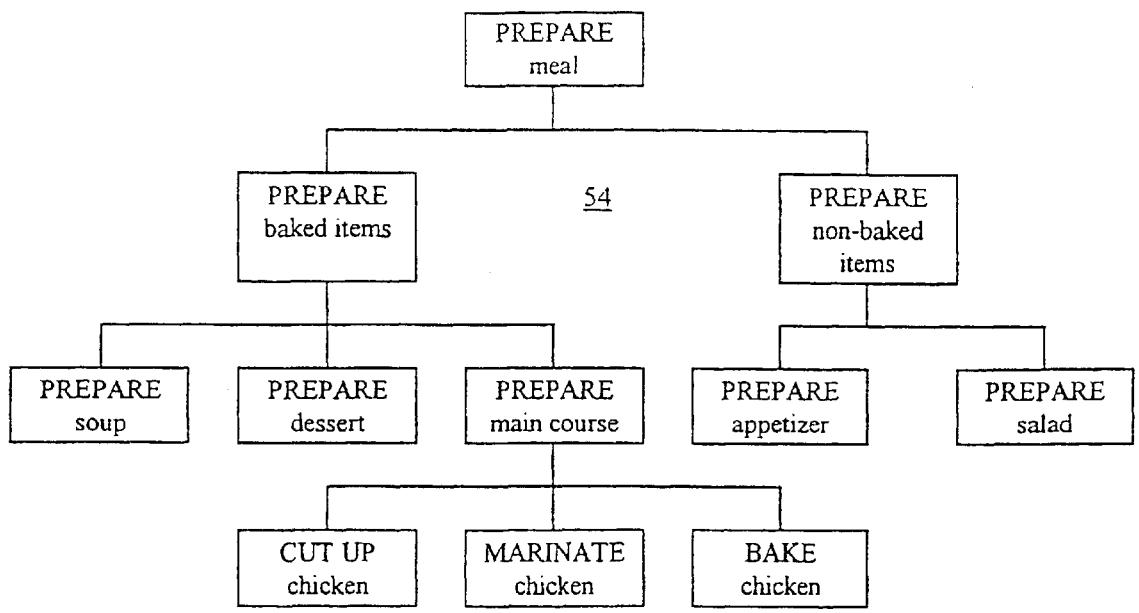
Figure 11:
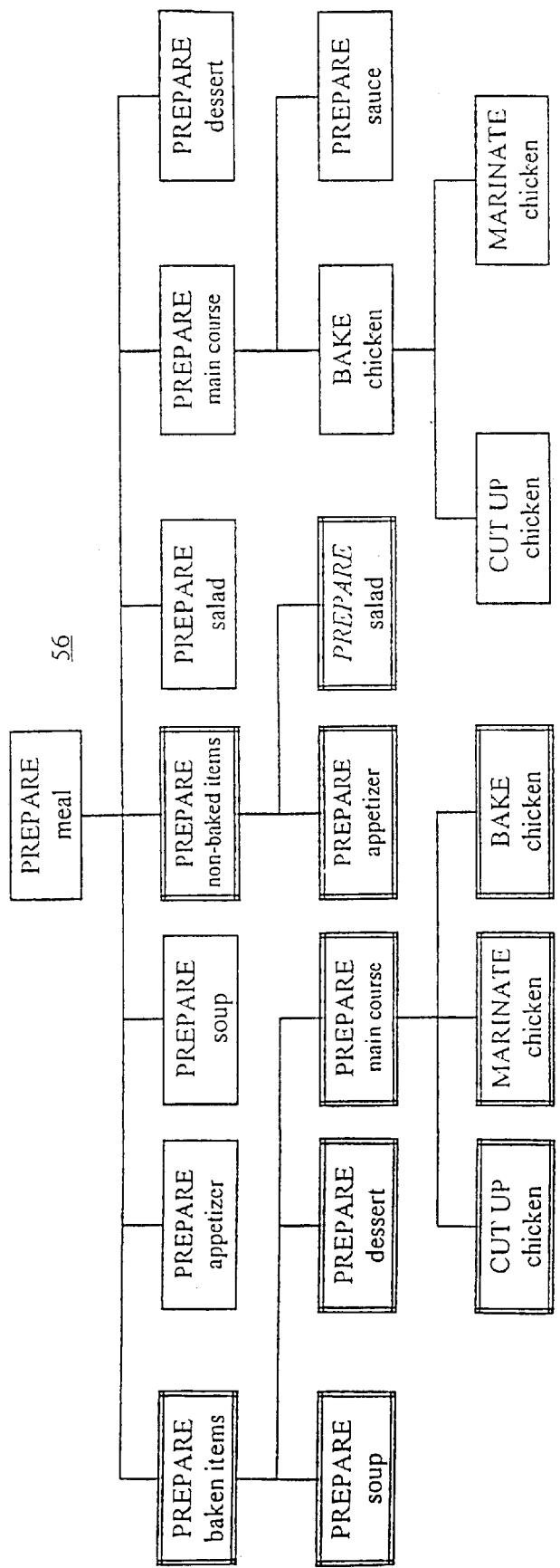
FIG. 11 shows the partially integrated structure of FIGS. 10(a) and 10(b) after step 6 of integration technique #1.
Figure 12:
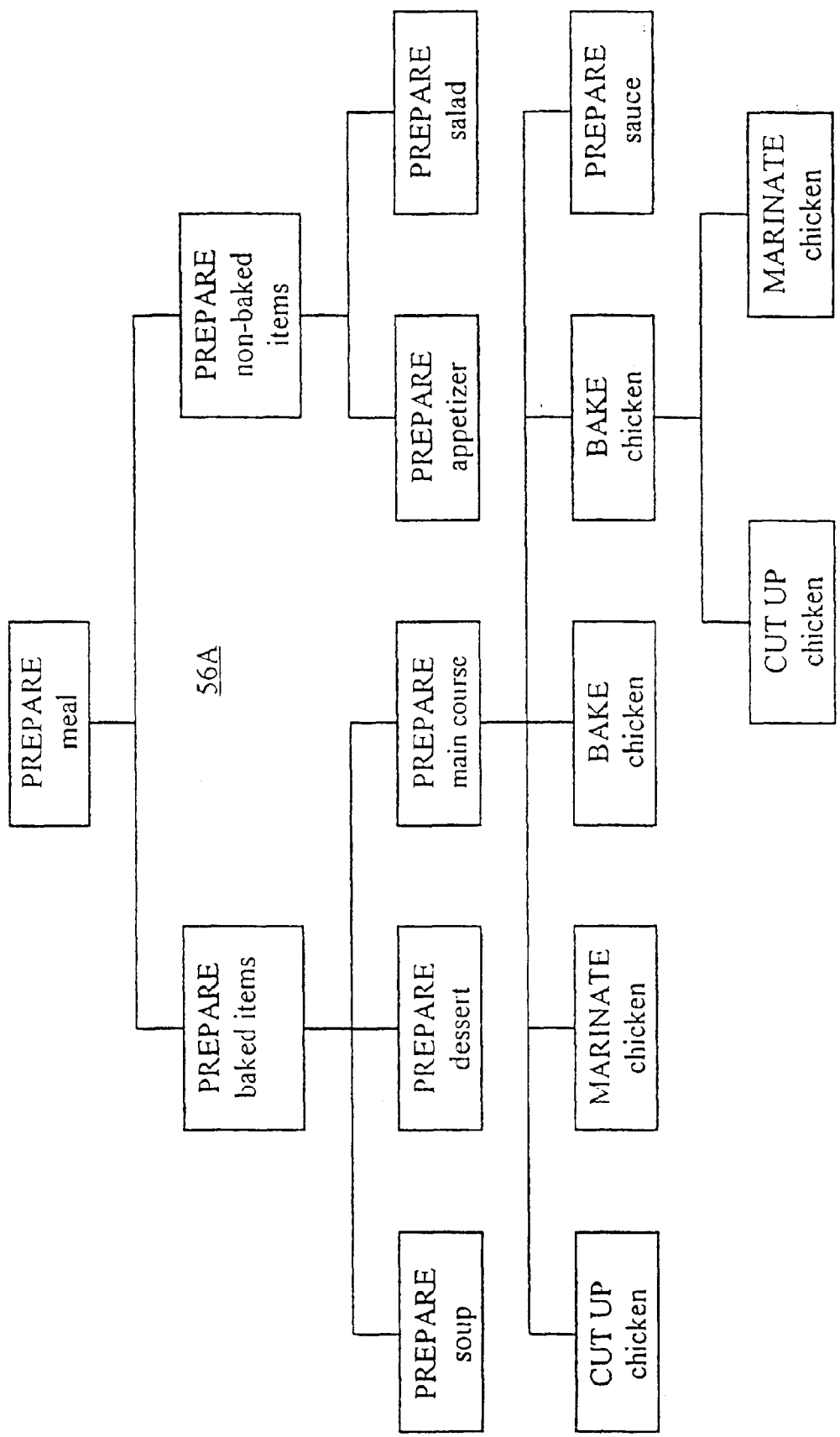
FIG. 12 shows the partially integrated structure of FIGS. 10(a) and 10(b) after step 9 of integration technique #1.
Figure 13:
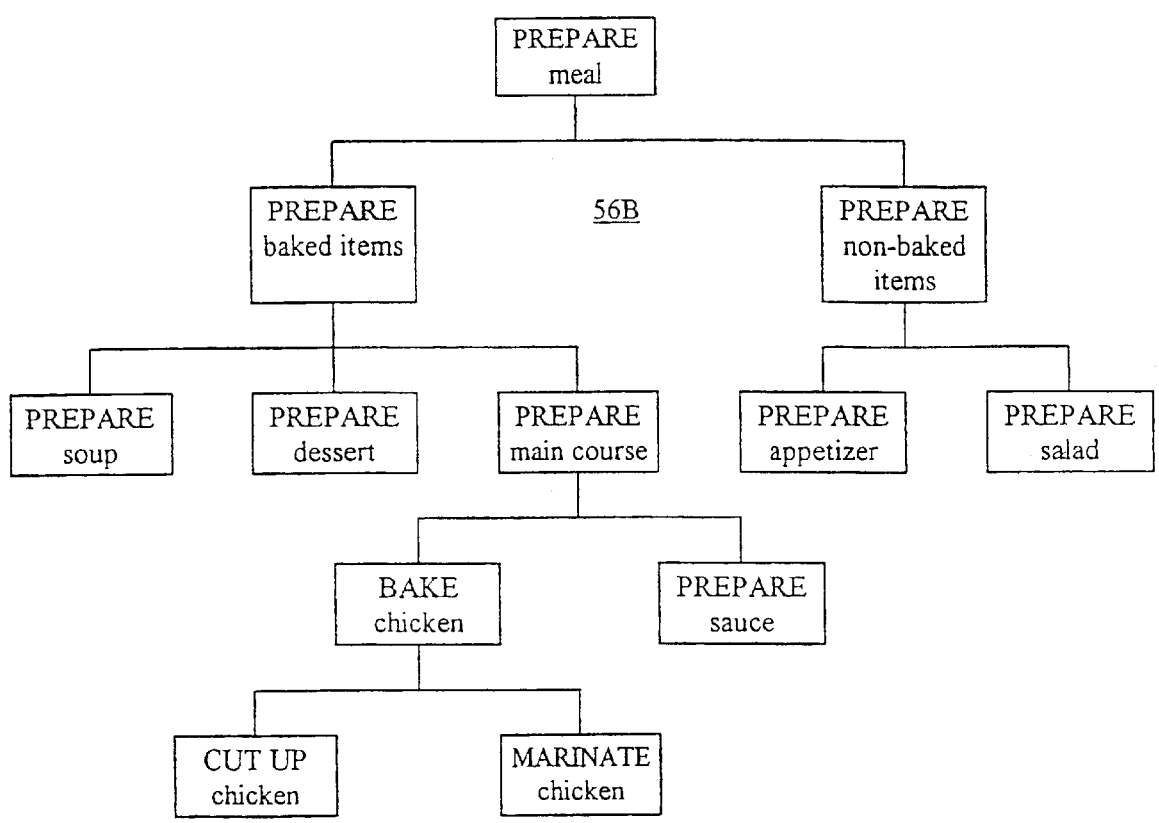
FIG. 13 shows a fully integrated MINDBASE structure after integration technique #1 has completed integrating the MINDBASE structures of FIGS. 10(a) and 10(b).

FIGS. 10(a) and 10(b) show two effect MINDBASE structures 52 and 54 respectively, before they are integrated. Words representing effects are in upper case, whereas words representing the cause to which the effect is linked are in lower case. This convention of upper and lower case representation is followed throughout. FIG. 11 shows the integrated structure 56 after step 7 of integration technique #1, explained above. Data elements from structure 54 are shaded. In this example the top level data element of the second structure is also the top level data element of the integrated structure. FIG. 12 shows the integrated structure 56A after step 10. FIG. 13 shows the final integrated structure 56B after step 12 of integration technique #1. All parent/child relationships are maintained when using the MINDBASE integration technique. However, this process allows for adding levels between a parent and a child. It can be noted that "Baked Items" and "Non-baked Items" have been put between "Prepare Meal" and the five parts of the meal.

Integration Technique #2 for Single Parent Data Elements

MINDBASE integration technique #2 is used to computerize MINDBASE integration technique #1. The MINDBASE system is capable of completely integrating two heterogeneous MINDBASE structures into a single MINDBASE structure if the top level data element in each structure is substantially the same or differentiated only by descriptors. For example, an automobile and a tractor would not be substantially the same, but an automobile and a sports car would be substantially the same.

A sub-structure of a larger structure can be integrated with another structure or sub-structure in another structure if the sub-structure has the same parent as the other structure or the same parent as the sub-structure in the other structure. The integrated structure or sub-structure retains all of the parent-child relationships that were in the two separate structures or sub-structures. The integrated structure or sub-structure also retains all of the cause-effect relationships that the data elements had when they were in the two separate structures or sub-structures. By making successive integrations of two structures or sub-structures, an unlimited number of heterogeneous structures or sub-structures can be integrated.

The terms "structures," "sub-structures," "hierarchies," and "tree structures" are used synonymously herein. This technique integrates two "structures," "sub-structures," "hierarchies" or "tree structures" as the terms are used in the computer science literature. A tree structure is visually composed of nodes or boxes, also known as data elements, connected by lines. Each node or box in the tree structure can have one or more "children" nodes or boxes. The top node or box in the tree structure is called the "root" node or box. It does not have a "parent" node or box. All nodes or boxes except the top node or box have one parent node or box. The only visual lines connecting nodes or boxes connect each parent to each of its children. If a node's parent has other children, these other children are "siblings" to the node or box in question. The technique below uses the term "up" to refer to the direction of the root node or box and the other terms of right, left, vertical, horizontal and down are relative to the "up" direction.

This technique integrates two structures, sub-structures, hierarchies or tree structures, called the Current Structure and the Other Structure into one or more "integrated structures." If the Starting Node in the technique below is the Root Node of a tree structure, then the entire tree structure will be integrated to the extent possible. If the Starting Node is some other node in the tree structure, then only part of the tree structure will be integrated to the extent possible.

If there is a node or box in one structure and a node or box in the other structure that both refer to the same cause or effect data element, then the one node is said to "correspond" to the other node. and visa-versa. The two nodes or boxes can have the same identifier or name, or can have different identifiers. If two corresponding nodes or boxes have different identifiers, the computer must record the different identifiers for the corresponding nodes or boxes in a translation table or by some other technique so that it will recognize that the differently identified nodes or boxes in different structures are actually corresponding nodes or boxes.

A node or box in one structure can have the same identifier as a node or box in the other structure and yet not correspond. In this case, the computer must record the two nodes or boxes and their identifier in a translation table or by some other technique so that it will recognize that the similarly identified nodes or boxes in different structures are actually not corresponding nodes or boxes.

If there is a node or box in one structure and a node or box in the other structure, and they correspond, and a new node or box is created in an integrated structure to refer to the same cause or effect data element as the two original nodes or boxes, then each of the two nodes or boxes in the original structures is said to "correspond" to the new node in the integrated structure and visa-versa.

The Root Node has the lowest level number in the tree structure. The children of the Root Node all have the next lowest level number. The children of the children of the Root Node all have the next lowest level number, etc.

Figure 18A:
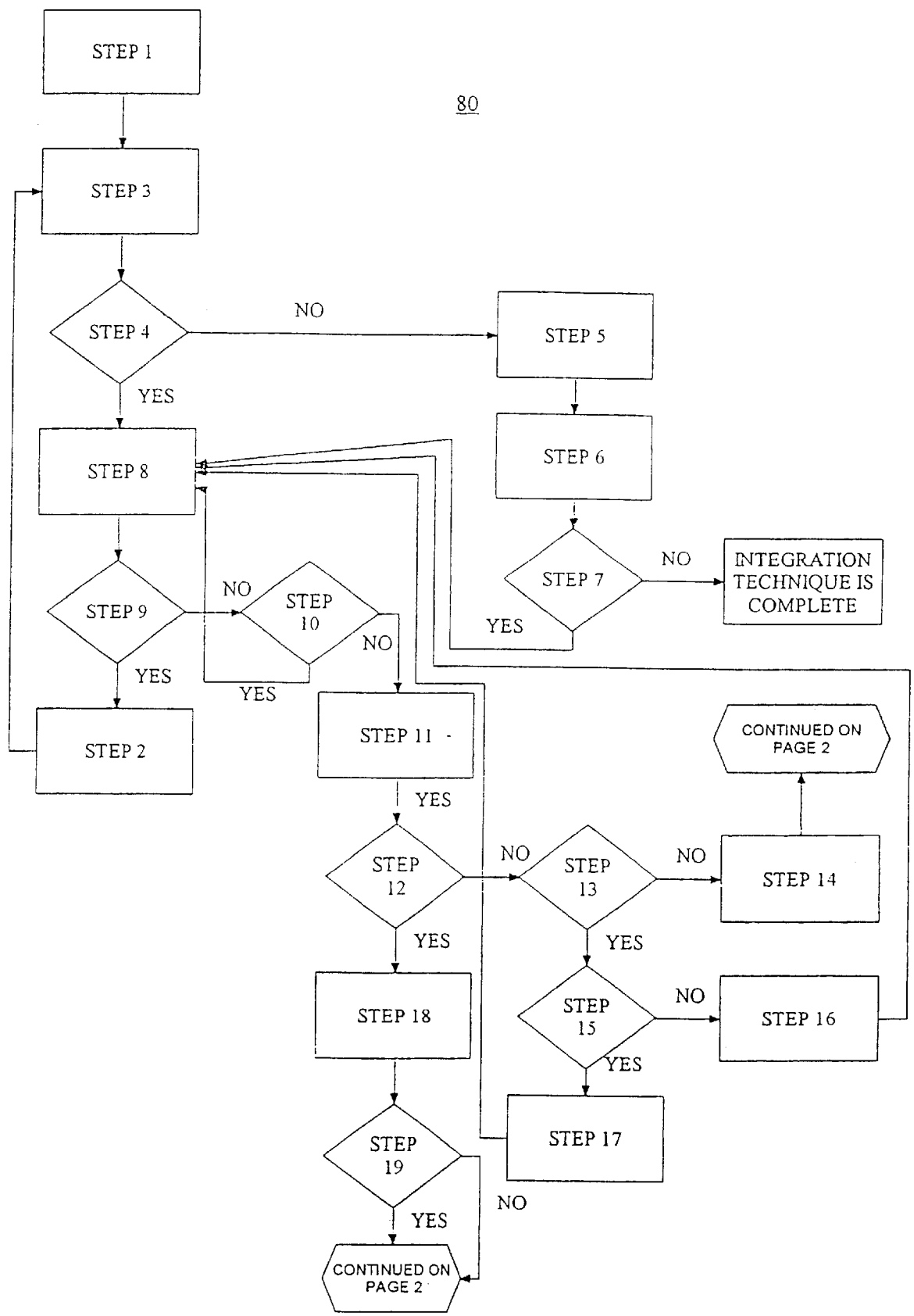
FIGS. 18(a) and 18(b) show a flowchart of the MINDBASE integration technique #2.
Figure 18B:
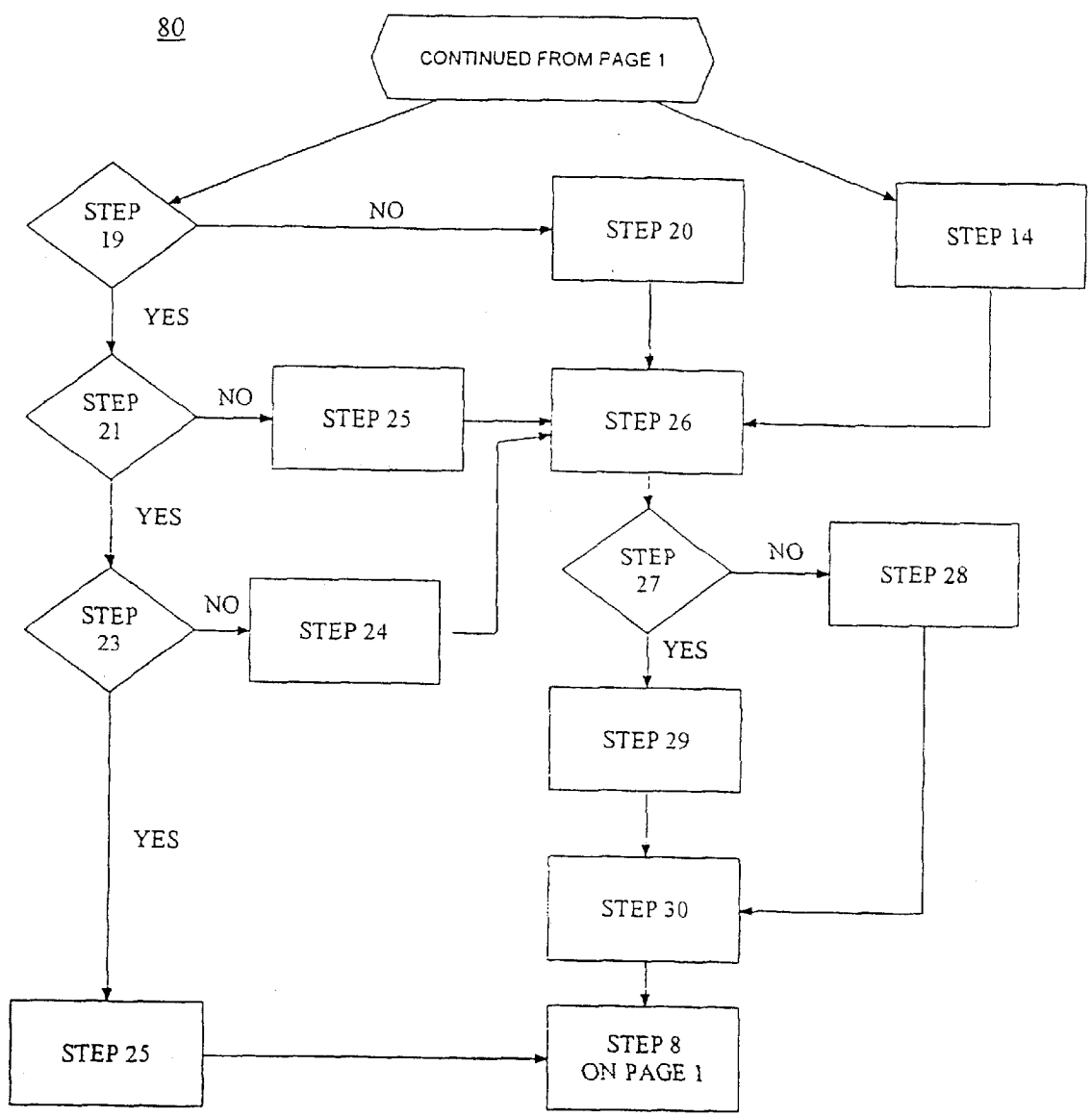

Integration technique #2 is illustrated by the flow chart 80 in FIGS. 18(a) and 18(b). In order to fit the flow chart into an area as small as only two sheets of drawings, the blocks of the flow chart are, with few exceptions, labeled only by step numbers, which correspond to the following enumerated steps.

(1) Record that the "Current Structure" is either of the two structures. Record that the "Other Structure" is the other structure. Create two lists of nodes called Lists of Held Out Nodes. Record that both lists are empty. Associate each list with one of the two structures. When a particular structure is assigned to be the Current Structure, then assign that structure's List of Held Out Nodes to be the List of Held Out Nodes for the Current Structure. Create a List of Discarded Nodes. Record that the list is empty. Choose a Starting Node in the Current Structure. Choose a Starting Node in the Other Structure. Go to step 3.

(2) Switch the Current Structure and the Other Structure. Thus, record that the Current Structure is the Other Structure, and record that the Other Structure is the previous Current Structure.

(3) Make the Current List of Nodes have the same contents as the List of Held Out Nodes for the Current Structure. If the List of Held Out Nodes for the Current Structure is empty, then the Current List of Nodes will be empty. Add to the Current List of Nodes all nodes on the next level down in the Current Structure that are either the Starting Node or that are descendants of the Starting Node. The first time this step is executed for a structure, the next level down is the level of the Starting Node.

(4) If the Current List of Nodes contains any nodes, then go to step 8.

(5) Switch the Current Structure and the Other Structure. Thus, record that the Current Structure is the Other Structure, and record that the Other Structure is the previous Current Structure.

(6) Make the Current List of Nodes have the same contents as the List of Held out Nodes for the Current Structure. If the List of Held Out Nodes for the Current Structure is empty, then the Current List of Nodes will be empty. Add to the Current List of Nodes all nodes on the next level down in the Current Structure that are either the Starting Node or that are descendants of the Starting Node. The first time this step is executed for a structure, the next level down is the level of the Starting Node.

(7) If the Current List of Nodes contains any nodes, then go to step 8. Otherwise this technique is completed.

(8) Record that the Current Node is the next node from the Current List of Nodes. Thus, the first time that this step is executed for a particular list containing a particular set of nodes, the next node from the list is the first node in the list.

(9) If there is no Current Node then go to step 2.

(10) If the Current Node has a corresponding node in an Integrated Structure, then go to step 8.

(11) Record that the Partner Node is the node in the Other Structure which is the corresponding node to the Current Node. If there is no corresponding node in the. Other Structure, record that there is no Partner Node. Record that the Integrated Current Parent Node is the node in an Integrated Structure which is the corresponding node to the parent of the Current Node. If the Current Node has no parent node or if the parent of the Current Node has no corresponding node in an Integrated Structure, record that there is no Integrated Current Parent Node.

(12) If there is a Partner Node then go to step 18.

(13) If there is no Integrated Current Parent Node then go to step 15.

(14) Record that the Prospective Integrated Parent Node is the Integrated Current Parent Node. Go to step 26.

(15) If the parent of the Current Node is not in the List of Held Out Nodes for the Current Structure go to step 17.

(16) If the Current Node is not in the List of Held Out Nodes for the Current Structure then add the Current Node to the List of Held Out Nodes for the Current Structure. In either case go to step 8.

(17) Add the Current Node to the List of Discarded Nodes. Go to step 8.

(18). Record that the Integrated Partner Parent Node is the node in an integrated structure which is the corresponding node to the parent of the Partner Node. If Partner Node has no parent node or,if the parent of the Partner Node has no corresponding node in an integrated structure, then record that there is no Integrated Partner Parent Node.

(19) If the Current Node has a parent node and if the Partner Node has a parent node then go to step 21.

(20) Record that there is no Prospective Integrated Parent Node. Go to step 26.

(21) If there is not an Integrated Current Parent Node or if there, is not an Integrated Partner Parent Node then go to step 23.

(22) If the level number of the Integrated Current Parent Node is greater than or equal to the level number of the Integrated Partner Parent Node then record that the Prospective Integrated Parent Node is the Integrated Current Parent Node, otherwise record that the Prospective Integrated Parent Node is the Integrated Partner Parent Node. Go to step 26.

(23) If the parent of the Current Node is not in the List of Discarded Nodes or if the parent of the Partner Node is not in the List of Discarded Nodes then go to step 25.

(24) Record that there is no Prospective Integrated Parent Node. Go to step 26.

(25) If the Current Node is not already in the List of Held Out Nodes for the Current Structure, then add it to the list. Go to step 8.

(26) Create a new node. Give it the same name as the Current Node, or the Partner Node if there is one. Record that the new node corresponds to the Current Node and visa-versa. If there is a Partner Node, record that the new node corresponds to the Partner Node and visa-versa.

(27) If there is a Prospective. Integrated Parent Node then go to step 29.

(28) Create a new integrated structure. Give it the same name as the Current Node or the Partner Node. Record that the New Node created in step 26 is in the new integrated structure. Record that the new node is the Root Node of the new integrated structure. Record that the new node has no parent node. Go to step 30.

(29) Record that the new node is a child of the Prospective Integrated Parent Node, in the same integrated structure as the Prospective Integrated Parent Node.

(30) If the Current Node is in the List of Held Out Nodes for the Current Structure, then remove it from the list. In either case, go to step 8.

Integration Technique #3 for Multiple Parent Data Elements

The MINDBASE system is capable of completely integrating two heterogeneous MINDBASE structures into a single MINDBASE structure if the top level data element in each structure is substantially the same or differentiated only by descriptors. For example, an automobile and a tractor would not be substantially the same, but an automobile and a sports car would be substantially the same.

A sub-structure of a larger structure can be integrated with another structure or sub-structure in another structure if the sub-structure has the same parent as the other structure or the same parent as the sub-structure in the other structure. The integrated structure or sub-structure retains all of the parent-child relationships that were in the two separate structures or sub-structures. The integrated structure or sub-structure also retains all of the cause-effect relationships that the data elements had when they were in the two separate structures or sub-structures. By making successive integrations of two structures or sub-structures, an unlimited number of heterogeneous structures or sub-structures can be integrated.

Figure 19:
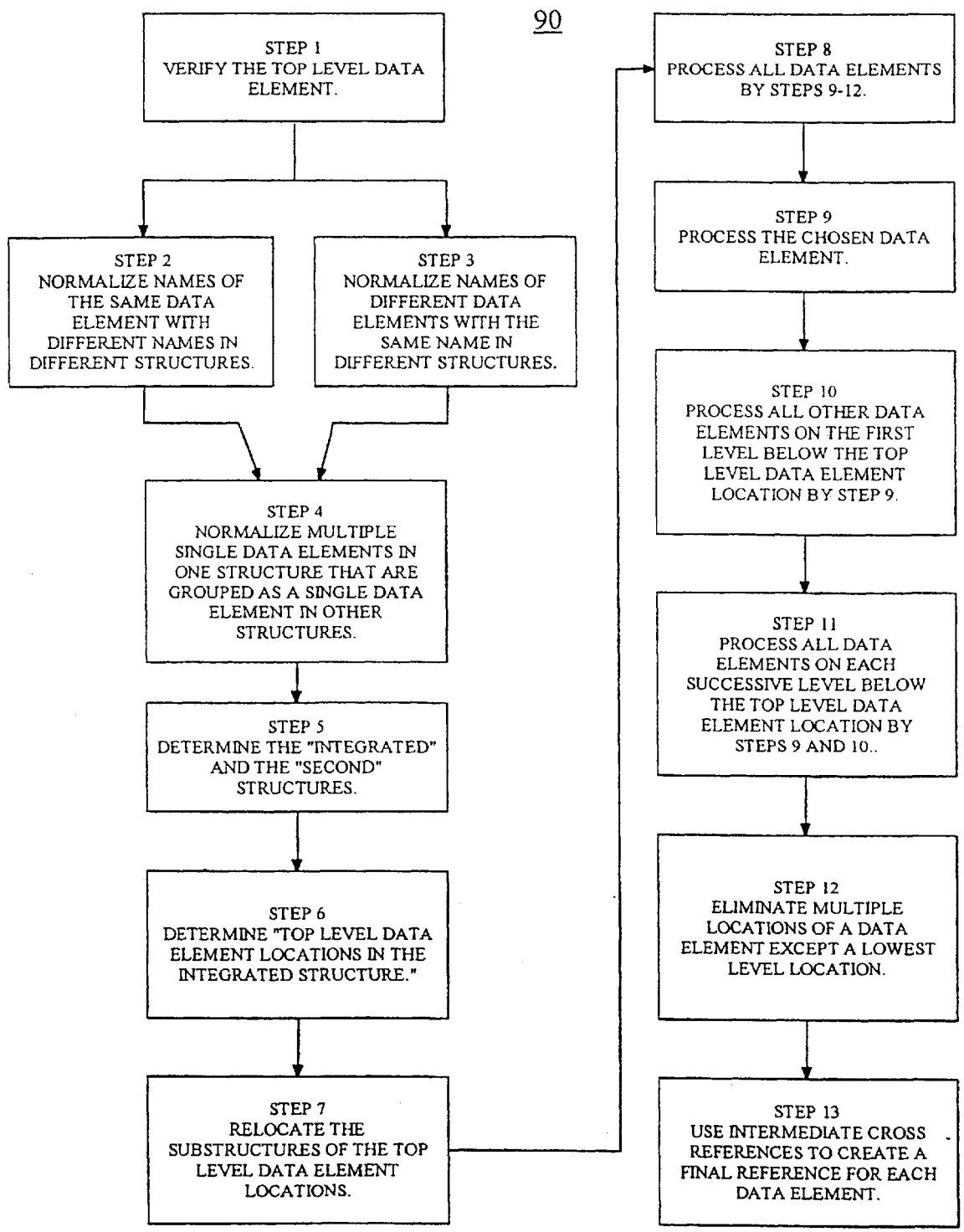
FIG. 19 shows a flowchart of the MINDBASE integration technique #3.

The MINDBASE integration technique used to integrate two heterogeneous data structures is shown in flow chart 90 in FIG. 19. The steps in the flow chart correspond to the following steps. Steps 2 and 3 can be performed in any order.

(1) Verify that the top level data element of one of the two MINDBASE structures that are to be integrated is located in the other MINDBASE structure.

(2) Examine the MINDBASE structures that are being integrated to determine if any data elements in the structures are the same but have different names in the different structures. Data elements can be considered the same even if they are differentiated by descriptors. The same name is given to all locations of the same data element in the structures that are being integrated. An example of this would be an automobile that is called a red automobile in the integrated structure and a green car in the second structure. One name is chosen for the data elements "automobile" and "car" and that name is given to all locations of automobile and car in the structures that are being integrated. If a data element's name is changed in any structure that is being integrated, the changed name is cross-referenced to its original name in the original structure.

(3) Examine the MINDBASE structures that are being integrated to determine if different data elements in different structures have the same name in different structures. An example would be using the word "vehicle" as the name of a data element that is a car in one data structure and also using "vehicle" as the name of a data element that is a truck in another data structure. A different name must be given to one of the two different data elements in the different structures. If a data element's name is changed in any structure that is being integrated, the changed name is cross-referenced to its original name in the original structure.

(4) Examine the MINDBASE structures that are being integrated to determine if two or more separate data elements in one data structure are grouped as a single data element in other structures. An example is data elements "A" and "B" in one structure being grouped together as data element "C" in another structure. When this occurs, this procedure will not recognize that "All and "NB" are the same as "C." If the user wants A and B to be recognized as the same as C, then the user must either separate C into A and B in C's data structure or join A and B in A and B's data structure to make C. The separated data elements must be cross-referenced to the combined data element in the original structure, and the joined data element must be cross-referenced to the separated data elements in the original structure.

(5) Make a copy of both MINDBASE structures that are to be integrated. If top level data elements of the two structures are the same, name either of the copies the "integrated" structure and name the other copy the "second" structure. If the top level data elements of the two structures are not the same, then the copy of the MIND BASE structure whose top level data element is located below the top level data element of the other structure is identified as the "second" structure. The copy of the other MINDBASE structure is called the "integrated" structure.

(6) Locate all data elements in the integrated structure that are the same as the top level data element in the second structure. Name these data element locations in the integrated structure "top level data element locations."

(7) Under each of the "top level data element locations" in the integrated structure place the substructure of the top level data element of the second structure. Record a cross-reference for each data element that is moved to the integrated structure. The ross-reference must relate the data element's new position in the integrated structure to its previous position in the second structure.

(8) Process all "top level data element locations" in the integrated structure by steps 9 through 13.

(9), Choose any data element on the first level below the "top level data element location" in the integrated structure. Identify this data element as the chosen data element and name its location the "first location of the chosen data element." If the chosen data element appears in other locations in the substructure of the "top level data element location," place the substructure of the "first location of the chosen data element" under the other locations of the chosen data element. Any data elements that are moved in this;'step retain all parents except that the children of the "first location of the chosen data element" do not retain the "first location of the chosen data element" as a parent. Regardless of whether or not the first location of the chosen data element has a substructure, if the chosen data element appears in other locations in the substructure of the "top level data element location," remove the "first location of the chosen data element" from the structure that results from this step of the integration process. All parents of the "first location of the chosen data element" that is removed shall be made parents of any remaining chosen data element locations. Record a cross-reference for each data element that is moved in this step. The cross-reference must relate the data element's position after being moved to its position. before being moved.

(10) Process all other data elements on the first level below the top level data element location by the process in step 9 above.

(11) Process all data elements on each successive level below the top level data element location by the processes in steps 9 and 10 above. For the purpose of this step only, the words "first level" in the first sentence of steps 9 and 10 are replaced with "next successive level." Process all data elements on each level before proceeding to the next successive level.

(12) If the same data element appears in multiple locations of the structure that results from step 11, eliminate all locations except a single location on the lowest level. If the data element appears more than once on the lowest level, any location on the lowest level can be randomly chosen to be saved. Link the remaining location to all of the parents of the locations that were eliminated.

(13) Use the intermediate cross-references in all previous steps to create a final reference that relates each data element in the final step of the integration process to its location in its original hierarchy.

Integration technique #3 can be used successively to integrate an unlimited number of heterogeneous MIND-BASE data structures if the top level data element of each successive data structure is found anywhere in the previous integrated structure. Integrated structures can be used to completely integrate all activities of the individual heterogeneous structures that were integrated. When activities are done in one of the structures that were integrated, the integrated structure can be used to integrate those activities into all of the other structures that were integrated Since the integrated structure has all of the parent-child relationships and the cause-effect relationships of the individual structures, it can be used in place of the original structures.

The integrated structures that result from integrating two or more heterogeneous data structures are automatically treated as any other MINDBASE structure. MINDBASE will automatically store multiple locations of the same data element at a single location as was explained in step 6 of the MINDBASE rules. MINDBASE will code the integrated structures and hierarchies as it would any other MINDBASE structure.

Integration Technique #4 for Single Parent Data Elements

Integration Technique #4 is used to computerize MIND-BASE Integration Technique #3. The MINDBASE system is capable of completely integrating two heterogeneous MINDBASE structures into a single MINDBASE structure if the top level data element in each structure is substantially the same or differentiated only by descriptors. For example, an automobile and a tractor would not be substantially the same, but an automobile and a sports car would be substantially the same.

A sub-structure of a larger structure can be integrated with another structure or sub-structure in another structure if the sub-structure has the same parent as the other structure or the same parent as the sub-structure in the other structure. The integrated structure or sub-structure retains all of the parent-child relationships that were in the two separate structures or sub-structures. The integrated structure or sub-structure also retains all of the cause-effect relationships that the data elements had when they were in the two separate structures or sub-structures. By making successive integrations of two structures or sub-structures, an unlimited number of heterogeneous structures or sub-structures can be integrated.

The terms "structures," "sub-structures," "hierarchies," and "tree structures" are used synonymously herein. This technique integrates two "structures," "sub-structures," "hierarchies" or "tree structures" as the terms are used in the computer science literature. A tree structure is visually composed of nodes or boxes, also known as data elements, connected by lines. Each node or box in the tree structure can have one or more "children" nodes or boxes. The top node or box in the tree structure is called the "root" node or box. It does not have a "parent" node or box. All nodes or boxes except the top node or box have one parent node or box. The only visual lines connecting nodes or boxes connect each parent to each of its children. If a node's parent has other children, these other children are "siblings" to the node or box in question. The technique below uses the term "up" to refer to the direction of the root node or box and the other terms of right, left, vertical, horizontal and down are relative to the "up" direction.

This technique integrates two structures, sub-structures, hierarchies or tree structures, called the Current Structure and the Other Structure into one or more "integrated structures." If the Starting Node in the technique below is the Root Node of a tree structure, then the entire tree structure will be integrated to the extent possible. If the Starting Node is some other node ii the tree structure, then only part of the tree structure will be integrated to the extent possible.

If there is a node or box in one structure and a node or box in the other structure that both refer to the same cause or effect data element, then the one node is said to "correspond" to the other node and visa-versa. The two nodes or boxes can have the same identifier or name, or can have different identifiers. If two corresponding nodes or boxes have different identifiers, the computer must record the different identifiers for the corresponding nodes or boxes in a translation table or by some other technique so that it will recognize that the differently identified nodes or boxes in different structures are actually corresponding nodes or boxes.

A node or box in one structure can have the same identifier as a node or box in the other structure and yet not correspond. In this case, the computer must record the two nodes or boxes and their identifier in a translation table or by some other technique so that it will recognize that the similarly identified nodes or boxes in different structures are actually not corresponding nodes or boxes.

If there is a node or box in one structure and a node or box in the other structure, and they correspond, and a new node or box is created in an integrated structure to refer to the same cause or effect data element as the two original nodes or boxes, then each of the two nodes or boxes in the original structures is said to "correspond" to the new node in the integrated structure and visa-versa.

The Root Node has the lowest level number in the tree structure. The children of the Root Node all have the next lowest level number. The children of the children of the Root Node all have the next lowest level number, etc.

Figure 20A:
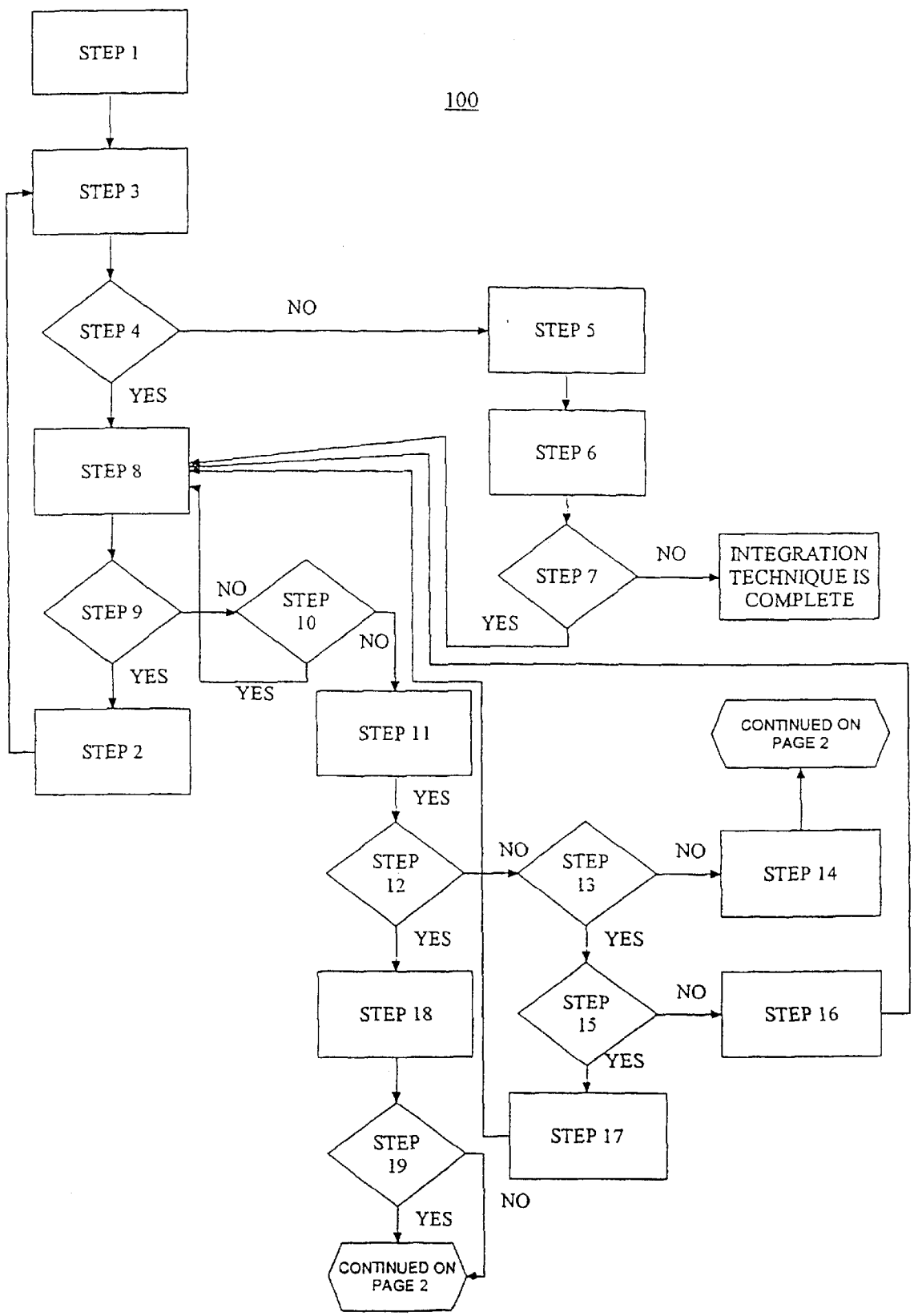
FIGS. 20(a) and 20(b) show a flowchart of the MINDBASE integration technique #4.
Figure 20B:
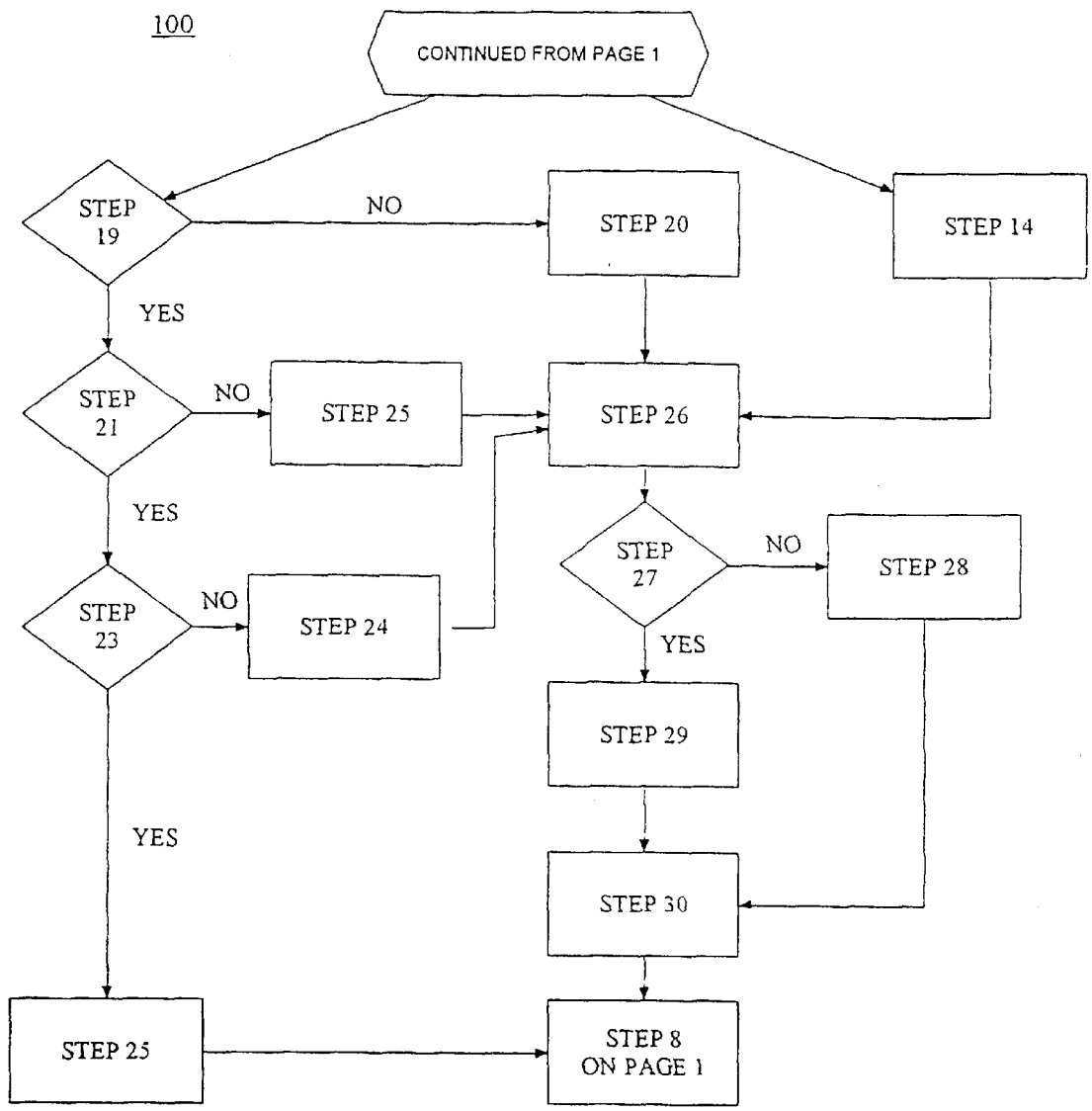

Integration technique #4 is illustrated by the flow chart 100 in FIGS. 20(a) and 20(b). In order to fit the flow chart into an area as small as only two sheets of drawings, the blocks of the flow chart are, with few exceptions, labeled only by step numbers, which correspond to the following enumerated steps.

(1) Record that the "Current Structure" is either of the two structures. Record that the "Other Structure" is the other structure. Create two lists of nodes called Lists of Held Out Nodes. Record that both lists are empty. Associate each list with one of the two structures. When a particular structure is assigned to be the Current Structure, then assign that structure's List of Held Out Nodes to be the List of Held Out Nodes for the Current Structure. Create a List of Discarded Nodes. Record that the list is empty. Choose a Starting Node in the Current Structure. Choose a Starting Node in the Other Structure. Go to step 3.

(2) Switch the Current Structure and the Other Structure. Thus, record that the Current Structure is the Other Structure, and record that the Other Structure is the previous Current Structure.

(3) Make the Current List of Nodes have the same contents as the List of Held Out Nodes for the Current Structure. If the List of Held Out Nodes for the Current Structure is empty, then the Current List of Nodes will be empty. Add to the Current List of Nodes all nodes on the next level down in the Current Structure that are either the Starting Node or that are descendants of the Starting Node. The first time this step is executed for a structure, the next level down is the level of the Starting Node.

(4) If the Current List of Nodes contains any nodes, then go to step 8.

(5) Switch the Current Structure and the Other Structure. Thus, record that the current Structure is the Other Structure, and record that the Other Structure is the previous Current Structure.

(6) Make the Current List of Nodes have the same contents as the List of Held Out Nodes for the Current Structure. If the List of Held Out Nodes for the Current Structure is empty, then the Current List of Nodes will be empty. Add to the Current List of Nodes all nodes on the next level down in the Current Structure that are either the Starting Node or that are descendants of the Starting Node. The first time this step is executed for a structure, the next level down is the level of the Starting Node.

(7) If the Current List of Nodes contains any nodes, then go to step 8. Otherwise this technique is completed.

(8) Record that the Current Node is the next node from the Current List of Nodes. Thus, the first time that this step is executed for a particular list containing a particular set of nodes, the next node from the list is the first node in the list.

(9) If there is no Current Node then go to step 2.

(10) If the Current Node has a corresponding node in an Integrated Structure, then go to step 8.

(11) Record that the Partner Node is the node in the Other Structure which is the corresponding node to the Current Node. If there is no corresponding node in the Other Structure, record that there is no Partner Node. Record that the Integrated Current Parent Node(s) is (are) the node(s) in an Integrated Structure which is (are) the corresponding node(s) to the parent(s) of the Current Node. If the Current Node has no parent node or if the parent(s) of the Current Node has(have) no corresponding node(s) in an Integrated Structure, record that there is no Integrated Current Parent Node.

(12) If there is a Partner Node then go to step 18.

(13) If there is no Integrated Current Parent Node then go to step 15.

(14) Record that the Prospective Integrated Parent Node (s) is(are) the Integrated Current Parent Node(s). Co to step 26.

(15) If the parent of the Current Node is not in the list of Held Out Nodes for the Current Structure go to step 17.

(16) If the Current Node is not in the List of Held Out Nodes for the Current Structure then add the Current Node to the List of Held Out, Nodes for the Current Structure. In either case go to step 8.

(17) Add the Current Node to the List of Discarded Nodes. Go to step 8.

(18) Record that the Integrated Partner Parent Node(s) is(are) the node(s) in an integrated structure which is(are) the corresponding node(s) to the parent(s) of the Partner Node. If the Partner Node has no parent node or if the parent(s) of the Partner Node has no corresponding node(s) in an integrated structure, then record that there is no Integrated Partner Parent Node.

(19) If the Current Node has a parent node and if the Partner Node has a parent node then go to step 21.

(20) Record that there is no Prospective Integrated Parent Node. Go to step 26.

(21) If there is not an Integrated Current Parent Node or if there is not an Integrated Partner Parent Node then go to step 23.

(22) Determine the highest level number of any Integrated Current Parent Node (s) or Integrated Parent Parent Node (s). Record that The Prospective Integrated Parent Node (s) is (are) the Integrated Current Parent Node (s) and the Integrated Partner Parent Node (s) that are on this highest level. Go to step 26.

(23) If the parent of the Current Node is not in the List of Discarded Nodes or if the parent of the Partner Node is not in the List of Discarded Nodes then, go to step 25.

(24) Record that there is no Prospective Integrated Parent Node. Go to step 26.

(25). If the Current Node is not already in the List of Held Out Nodes for the .Current Structure, then add it to the list. Go to step 8.

(26) Create a new node. Give it the same name as the Current Node, or the Partner Node if there is one. Record that the new node corresponds to the Current Node and visa-versa. If there is a Partner Node, record that the new node corresponds to the Partner Node and visa-versa.

(27) If there is (are) a Prospective Integrated Parent Node (s) then go to step 29.

(28) Create a new integrated structure. Give it the same name as the Current Node or the Partner Node. Record that the New Node created in step 26 is in the new integrated structure. Record that the new node is the Root Node of the new integrated structure. Record that the new node has no parent node. Go to step 30.

(29) Record that the new node is a child of the Prospective Integrated Parent Node(s), in the same integrated structure as the Prospective Integrated Parent Node (s). Also make the new node a child of all other nodes that are Integrated Current Parent Nodes or Integrated Partner Parent Nodes unless these other nodes are in the hierarchy of the Prospective Integrated Parent Nodes (s) between the Prospective Integrated Parent Node (s) and the root node.

(30) If the Current Node is in the List of Held Out Nodes for the Current Structure, then remove it from the list. In either case, go to step 8.

Arranging a Tree Structure for Display

This technique arranges a "Tree Structure" as the term is used in the computer science literature. A tree structure is visually composed of nodes or boxes connected by lines. Each node or box in the tree structure can have one or more "children" nodes or boxes. The children are kept in order. They are numbered from left to right starting with number one. These numbers are referred to as the "child numbers". The top node or box in the tree structure is called the "root" node or box. It does not have a "parent" node or box. All nodes or boxes except the top node or box have one parent node or box. The only visual lines connecting nodes or boxes connect each parent to each of its children. If a node's parent has other children, these other children are "siblings" to the node or box in question. This technique arranges the tree structure so the root node or box is at the top of the display and the children of a node or box are placed beneath it.

This technique can also be used to arrange a tree structure with the root node or box on either side or the bottom of the display device and the children of the node or box extending toward the opposite side of the display device. For example, if the root node or box of the tree structure is placed at the left side of the display device, then the children of the node or box would be placed to the right of it.

The terms "direction" and "path" are used in this description. The choice of "directions" is "up" or "down." The "path" to follow can have the values "center," "left," or "right." "Up" refers to the direction of the root node or box. "Down," "center," "left," and "right" are relative to the "up" direction. Steps seven (7) and eight (8), which are considered as a single unit, can trade places with steps nine (9) and ten (10), which are also considered as a single unit, without changing the effect or intent of this technique.

Figure 21A:
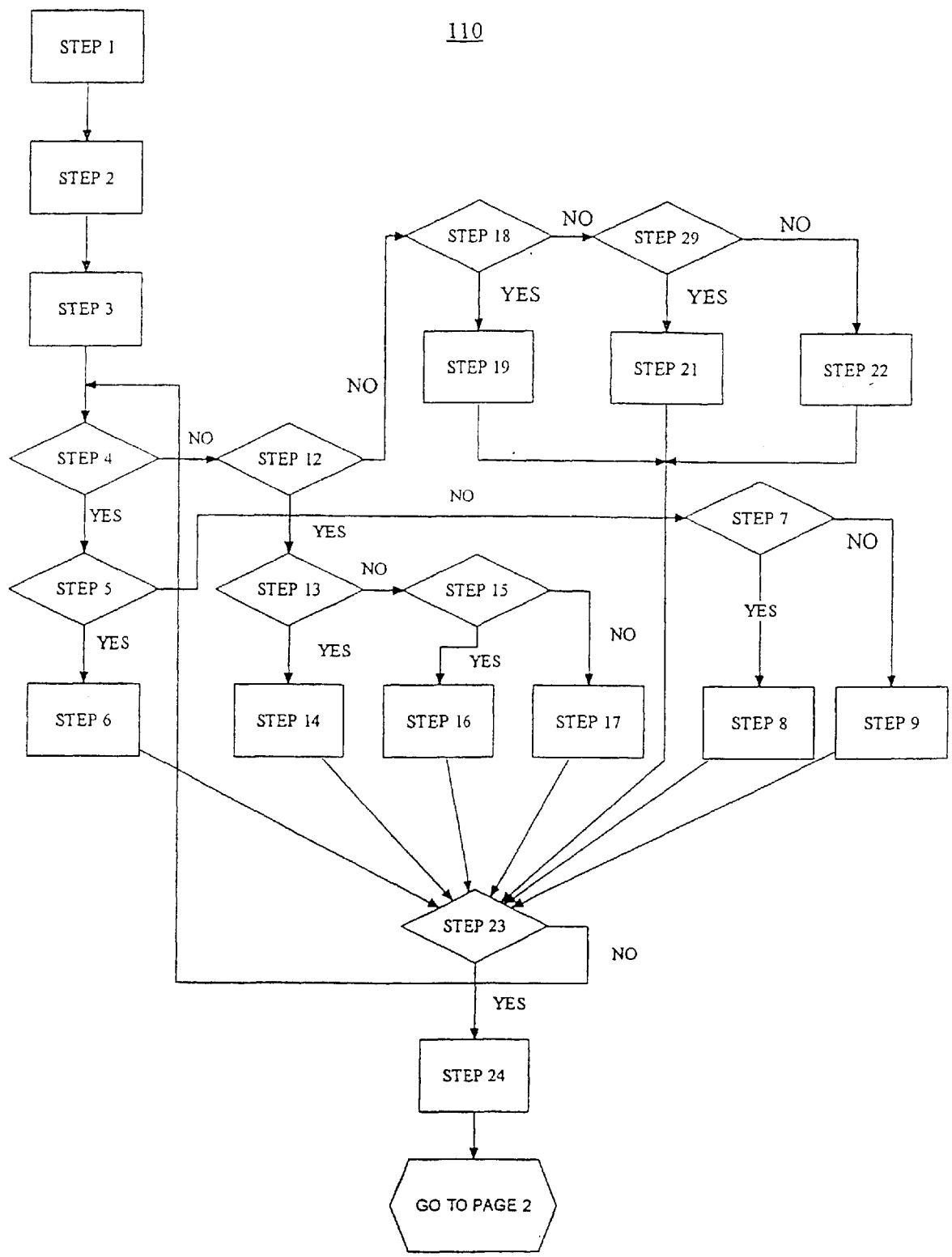
FIGS. 21(a) and 21(b) show a flowchart of the MINDBASE technique for arranging a tree structure for display.
Figure 21B:
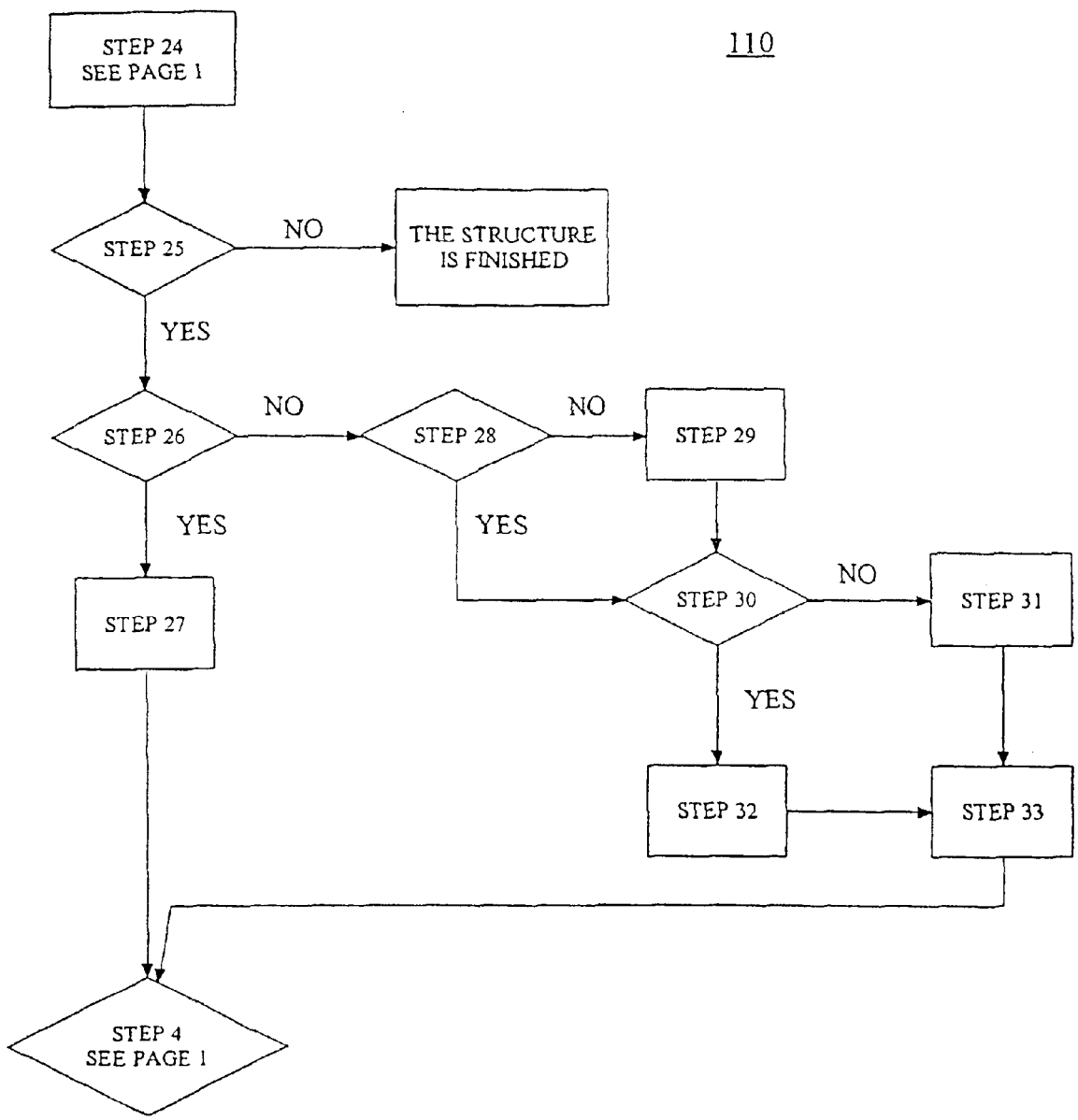

The method for arranging tree structures for display is illustrated by the flow chart 110 in FIGS. 21(*a*) and 21(*b*). In order to fit the flow chart into an area as small as only two sheets of drawings, the blocks of the flow chart are, with few exceptions, labeled only by step numbers, which correspond to the following enumerated steps.

(1) Determine the dimensions of the display device by recording it into the computer programming or by retrieving the required data if it resides in memory. Also determine the amount of vertical space on the display device that is needed for one horizontal level of the tree structure. A level is the vertical distance from a parent node or box to any of its children nodes or boxes.

(2) Arbitrarily choose a node or box to be the central node. Place the central node in the center of the display device.

(3) Record that the path to follow is "center." Record that the central node is now the current node. Record that the direction to go is "down." Record that the parent must not be checked. If the path to follow is "center" go to step 5. Otherwise go to step 12.

(5) If the direction to go is "down," and if the current node has a child and if there is enough space in the downward direction to display another level, then go to step 6. Otherwise go to step 7.

(6) Identify the central child of the current node. If the number of children of the current node is odd, then the central child is identified by dividing the total number of children of the current node by two and adding one half to the answer to arrive at the child number of the central child. If the number of children of the current node is even, then the central child is identified by dividing the number of children of the current node by two to arrive at the child number of the central child. Place the central child node one level below and directly below the current node. The central child node can be offset somewhat from the current node for aesthetic purposes. Record that the central child node is how the current node. Record that the rightmost position of nodes on that level is the right edge of the central child node. Record that the leftmost position of nodes on that level is the left edge of the central child node. Record that the current node is a previous,central parent. Go to step 23.

(7) If the current node has a sibling with a child number that is one more than the current node's child number and if there is enough space in the right ward direction to display another node, then record that that sibling is now the sibling node and go to step 8, otherwise go to step 9.

(8) Place the sibling node on the same horizontal level as the current node and a certain distance to the right from the current node. Record that the rightmost position of nodes on that level is the right edge of the sibling node. Record that the sibling node is now the current node. Record that the path to follow is "left." Record that the direction to go in is "down." Go to step 21.

(9) If the current node has a sibling with a child number that is one less than the current node's child number and if there is enough space in the left ward direction to display another node, then record that that sibling is now the sibling node and go to step 19, otherwise go to step 11.

(10) Place the sibling node on the same horizontal level as the current node and a certain distance to the left from the current node. Record that the leftmost position of nodes on that level is the left edge of the sibling node. Record that the sibling node is now the current node. Record that the path to follow is "right." Record that the direction to go in is "down." Go to step 23.

(11) Record that the parent must be checked. Go to step 23.

(12) If the path to follow is "left," go to step 13. Otherwise go to step 18.

(13) If the direction to go is "down," and if the current node has a child, ,and if there is enough space in the downward direction to display another level, then go to step 14. Otherwise, go to step 15.

(14) Identify the leftmost child node of the current node as being the child node of the current node with the lowest child number. Place the leftmost child node one level below the current node. Place the leftmost child node a certain distance to the right of the previously recorded rightmost position of nodes on that level. If there are no previously recorded nodes on that level, or if the previously recorded rightmost position of nodes on that level is far off to the left from the current node, then place the leftmost child node directly beneath the current node and to the left by one half of the distance of the following: the width of all of the leftmost child node's siblings plus an interstitial space between each two siblings. Record that the rightmost position of nodes on that level is the right edge of the leftmost child node. If there were no previously recorded nodes on that level, then record that the leftmost position of nodes on that level is the left edge of the leftmost child node. Record that the current node is a previous non-central parent. Record that the leftmost child node is now the current node. Go to step 23.

(15) If the current node has a sibling with a child number that is one more than the current node's child number and if there is enough space in the rightward direction to display another node, then record that that sibling is now the sibling node and go to step 16, otherwise go to step 17.

(16) Place the sibling node on the same horizontal level as the current node and a certain distance to the right from the current node. Record that the rightmost position of nodes on that level is the right edge of the sibling node. Record that the sibling node is pow the current node. Record that the path to follow is "left." Record that the direction to go is "down." Go to step 23.

(17) Record that the parent must be checked. Go to step 23.

(18) If the direction to go is "down," and if the current node has a child, and if there is enough space in the downward direction to display another level, then go to step 19. Otherwise, go to step 20.

(19) Identify the rightmost child node of the current node as being the child node of the current node with the highest child number. Place the rightmost child node one level below the current node. Place the rightmost child node a certain distance to the left of the previously recorded leftmost position of nodes on that level. If there are no previously recorded nodes on that level, or if the previously recorded leftmost position of nodes on that level is far off to the right from the current node, then place the rightmost child node directly beneath the current node and to the right by one half of the distance of the following: the width of all of the rightmost child node's siblings plus an interstitial space between each two siblings. Record that the leftmost position of nodes on that level is the left edge of the rightmost child node. If there were no previously recorded nodes on that level, then record that the rightmost position of nodes on that level is the right edge of the rightmost child node. Record that the current node is a previous non-central parent. Record that the rightmost child node is now the current node. Go to step 23.

(20) If the current node has a sibling with a child number that is one less than the current node's child number and if there is enough space in the leftward direction to display another node, then record that that sibling is now the sibling node and go to step 21, otherwise go to step 22.

(21) Place the sibling node on the same horizontal level as the current node and a certain distance to the left from the current node. Record that the leftmost position of nodes on that level is the left edge of the sibling node. Record that the sibling node is now the current node. Record that the path to follow is "right." Record that the direction to go in is down." Go to step 23.

(22) Record that the parent must be checked.

(23) If the parent must be checked, continue on to the following step. Otherwise go to step 4.

(24) Record that the parent of the current node is now the parent node.

(25) If there is a, parent node or if there is enough space in the upward direction from the current node to display another level of nodes, go to step 26. Otherwise the tree structure has been arranged and this technique is finished.

(26) If the path to follow is "left" and if the parent node has not been recorded as a previous non-central parent and if there is a sibling to the central child of the parent node and that sibling has a child number that is one less than that central child and if there is enough space in the leftward direction to display another node, then record that that sibling is the sibling node and go to step 27, otherwise go to step 28.

(27) Place the sibling node on the same horizontal level as the central child of the parent node and a certain distance to the left from the central child of the parent node. Record that the leftmost position of nodes on that level is the left edge of the sibling node. Record that the sibling node is now the current node. Record that the path to follow is "right." Record that the direction to go is "down." Record that the parent must not be checked. Go to step 4.

(28) If the parent node has been recorded as a previous central parent or if the parent node has been recorded as a previous noncentral parent, then go to step 30, otherwise go to step 29.

(29) Place the parent node one level above and directly above the current node.

(30) It parent node has been recorded as previous non-central parent then go to step 32, otherwise go to step 31.

(31) Record that the path to follow is "center." Go to step 33.

(32) Erase the record that the parent node is a previous noncentral parent.

(33) Leave the parent node on the same horizontal level as it was previously, but center it above all of its children that have been placed on the display device. The parent node can be offset somewhat to one side or the other for aesthetic purposes. Draw a line from the parent node to each of its children that have been placed on the display device. Record that the parent node is now the current node. Record that the direction to go in is "up." Record that the parent must not be checked. Go to step 4.

Scrolling an Indeterminable Large Tree Structure on a Display

Figure 22:
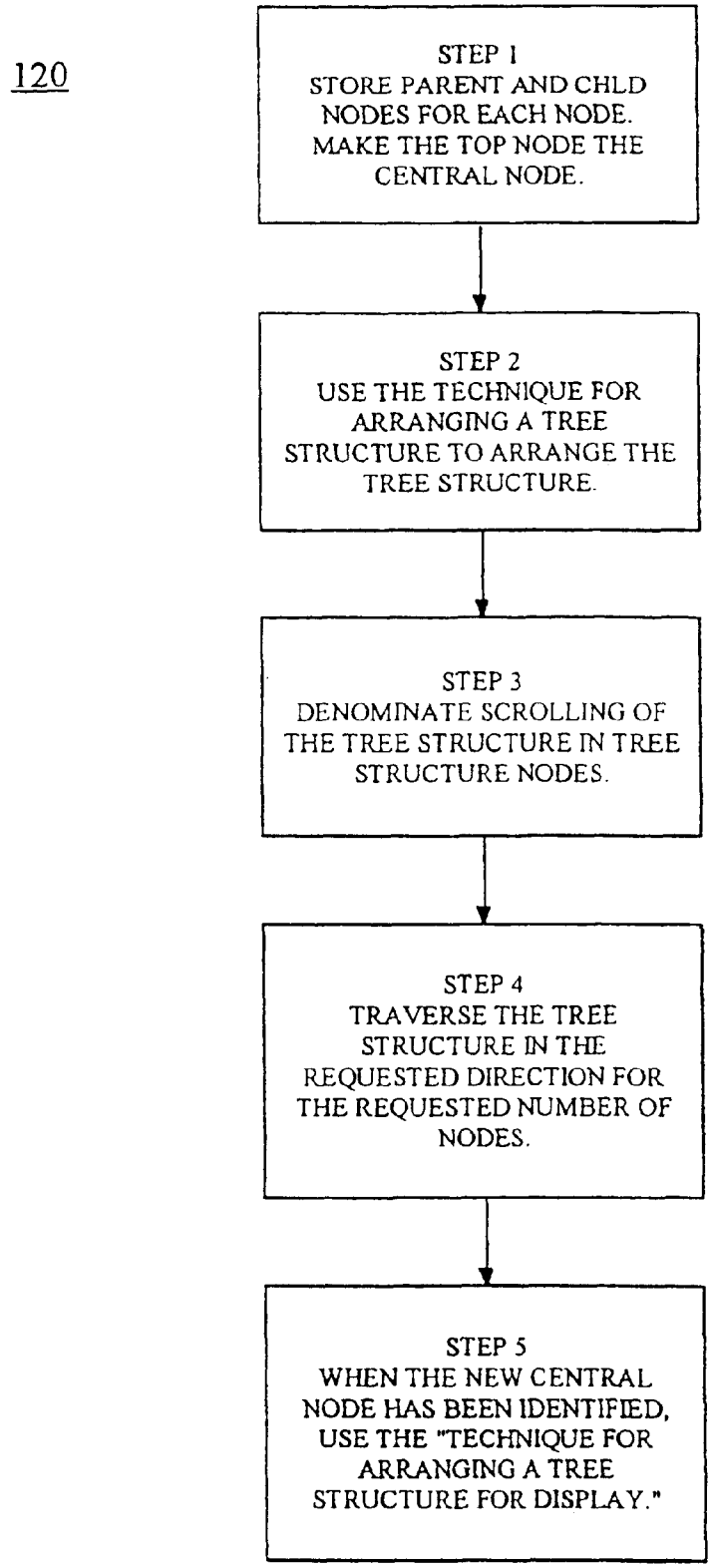
FIG. 22 shows a flowchart of the MINDBASE technique for scrolling an indeterminable large tree structure on a display device.

The method for scrolling an indeterminable large tree structure on a display device is shown in flow chart 120 in FIG. 22. The step numbers in the blocks correspond to the following steps.

(1) Start with all of the nodes of the tree structure. Have each node store the identifiers of its parent and children nodes and the nodes to its immediate left and immediate right. Bring the top node of the tree structure into random access memory. Make the top node of the tree structure the central node. The central node is described in the "Technique for Arranging a Tree Structure for Display."

(2). Use the technique for arranging a tree structure for display to arrange the tree structure on the display-device. As the arranging technique identifies a new node bring that new node into the random access memory of the computer.

(3) Have all scrolling of the tree structure denominated in tree structure nodes. Have a screen full or page sized move equal the number of nodes visible on the screen along the dimension of the request which can be left, right, up, or down. When the user indicates to the computer program that he or she wants to scroll the tree structure, translate that request into a request to move a certain. number of nodes in a certain direction.

(4) Traverse the tree structure in the requested direction for the requested number of nodes or until an edge of the tree structure is reached. If the request is to scroll the tree structure in an upward direction, use the current central node to identify the parent node and the parent node of the parent node, etc. until the new central node is identified. If the request is to scroll the tree structure in a downward direction, use the current central node to identify the central child as defined in the display arranging technique and the central child of the central child, etc. until the new central node is identified. If the request is to scroll the tree structure in a rightward direction, use the current central node to identify the node to the right, and the node to the right of the node to the right, etc. until the new central node is identified. If the request is to scroll the tree structure in a leftward direction, use the central node to identify the node to the left and the node to the left of the node to the left, etc. until the new central node is identified. In the process of traversing the tree structure, as a new node is identified bring that node into the random access memory of the computer.

(5) When the new central node has been identified, use the "Technique for Arranging a Tree Structure for Display."

The Level by Level Search Process

Figure 14:
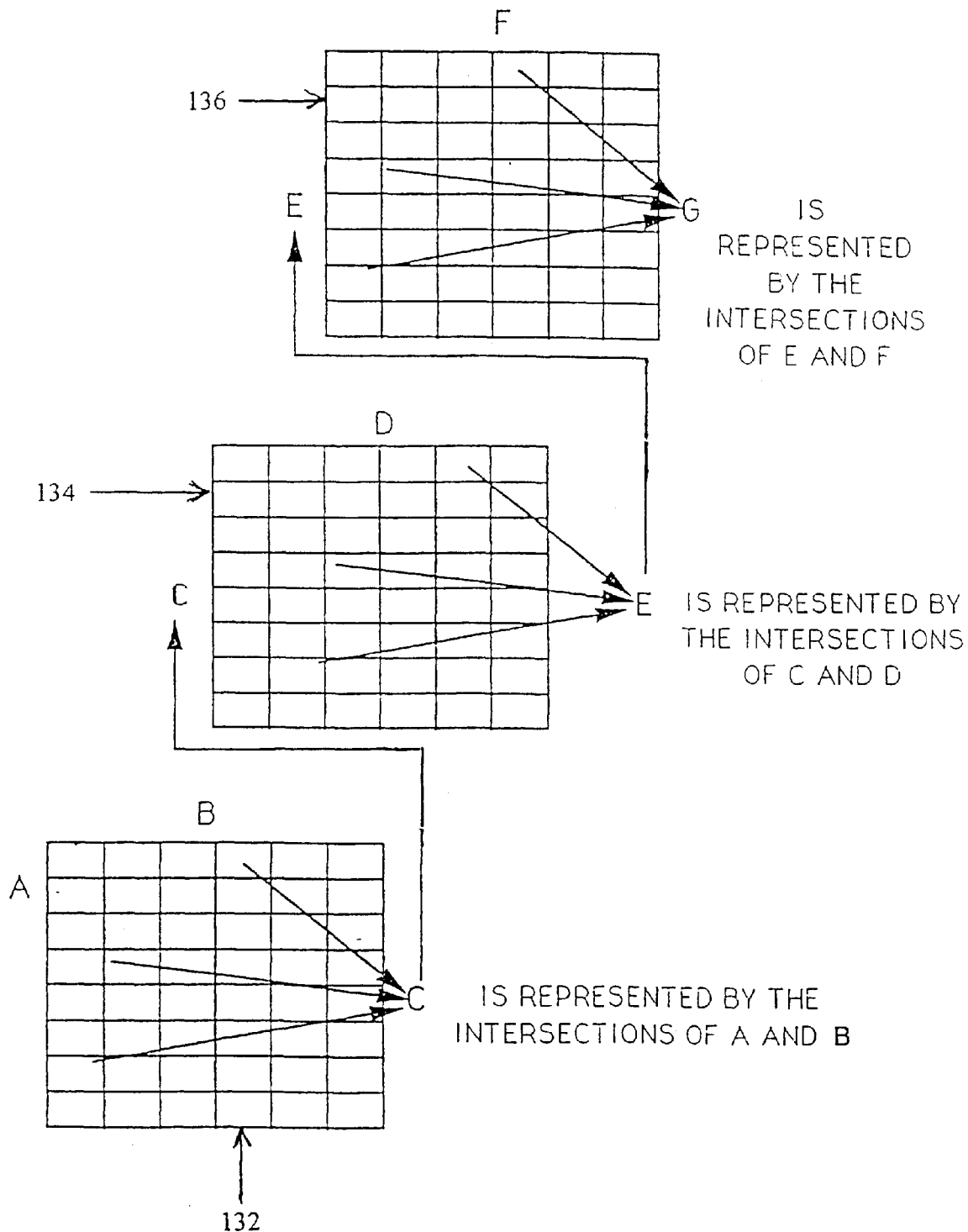
FIG. 14 shows sample matrices useful for explaining the MINDBASE level by level search process.

The level by level search process" can be used for designing each data element in a MINDBASE hierarchy. It can start at the top level of hierarchy and proceed to the bottom level or start at the bottom of the hierarchy and proceed to the top level. The Level by Level Search Process uses a series of matrixes 132, 134 and 136 shown in FIG. 14. The values for the rows and columns come from descriptors that give specific values or degrees of performance to cause and effect data elements. Therefore, different values of the rows and columns give different values or degrees of performance to cause and effect data elements and result in different designs. The level by level search process goes through cause structures and effect structures level by level and designs each cause and effect data element on one level before moving to the next level. To design a specific data element on a given level, the process determines values for each descriptor that applies to the specific data element.

Figure 23:
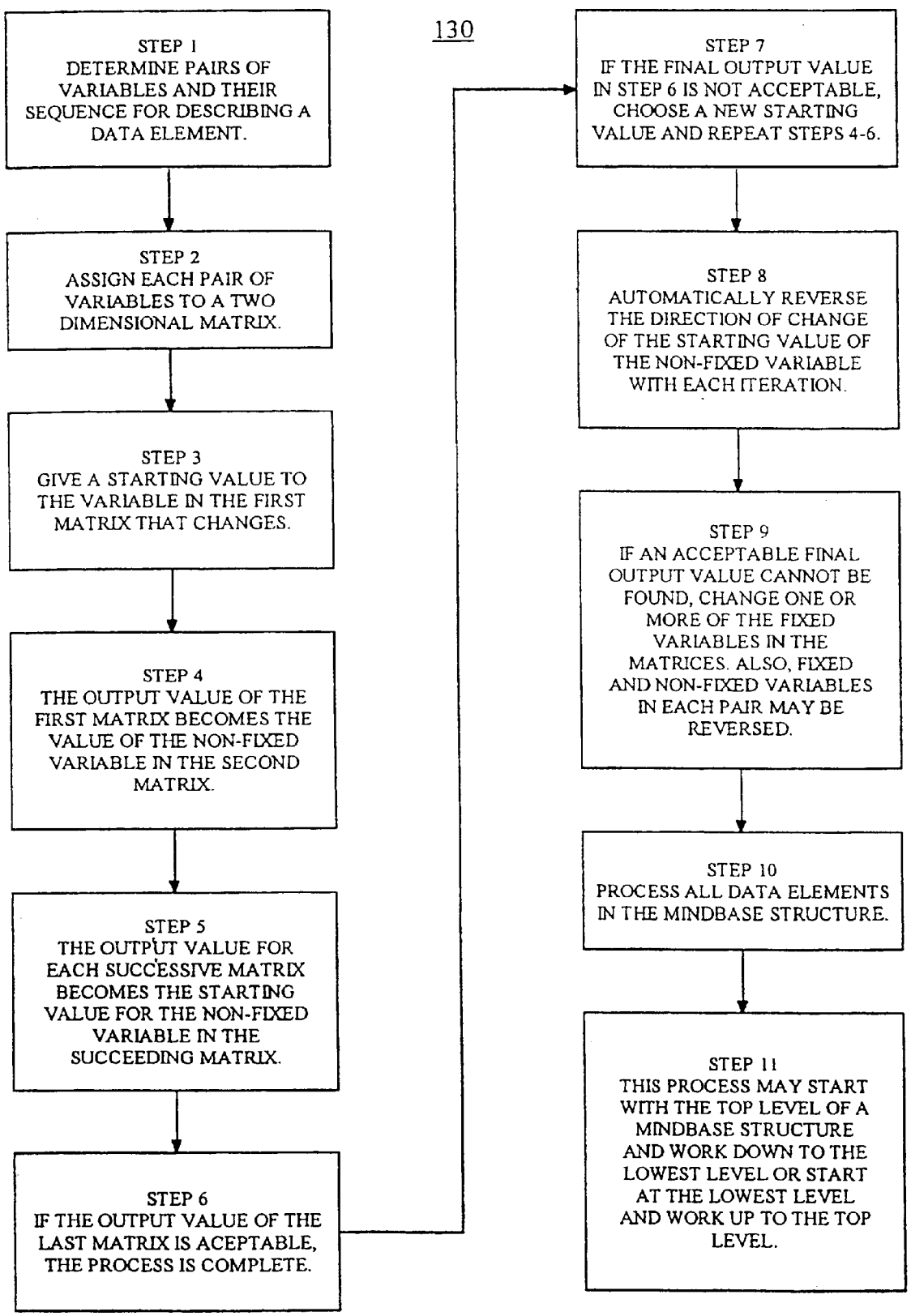
FIG. 23 shows a flowchart of the MINDBASE level by level search process.

The steps of the level by level search process are shown in flow chart 130 in FIG. 23 and correspond to the following steps.

(1) Determine pairs of variables and their sequence for describing a data element. The pairs of variables can be described as formulas. Each pair in the sequence results in a value that is used as the value for one of the variables in the next pair of variables in the sequence. The values for the variables are taken from the descriptors in the MINDBASE structure.

(2) Each pair of variables is assigned to a two dimensional matrix. One variable gives values to the rows of the matrix and the other variable gives values to the columns of the matrix. Either the rows or columns of each matrix is given a fixed value. The other variable is allowed to change with each iteration in the design process. For the purpose of this description, the columns are given a fixed value and the value of the rows will vary. However, in normal use, the rows can be given a fixed value and the value of the columns will vary.

(3) The variable of the first matrix that changes with each iteration, in this case the rows, is given an original "starting value." This original starting value is the best estimate of what the final value is expected to be for the non-fixed variable in the first matrix.

(4) The original starting value and the fixed value for the pair of variables in the first matrix determine an output value of the first matrix. This output value becomes the value for the non-fixed variable in the second matrix in the series of matrixes. In this case, the output value from the first matrix becomes the value for the rows in the second matrix.

(5) This value for the rows in the second matrix and the fixed value for the columns in the second matrix determine an output value for the second matrix. This output value becomes the value for the rows in the third matrix. This process continues until a final output is determined in the last matrix of the series.

(6) This final output is compared to the design specification. If the final output is within acceptable range of the design specification, the process is completed. The value of the variables in each matrix are used to determine the design characteristics of the particular data element that is being designed.

(7) If the final output is not within acceptable range, then a new starting value is chosen for the non-fixed variable in the first matrix, in this case the row variable, and the process described in steps 4–6 above is repeated. The user chooses the increment of change for the starting value which is used in each iteration and the maximum change in each direction from the original starting value for each non-fixed variable.

(8) The direction of change of the starting value of the non-fixed variable in the first matrix will automatically be reversed if the end result of an iteration is further from the acceptable value than the previous iteration. Iterations will automatically continue until the most acceptable value for the final output has been determined.

(9) If the search routine cannot find an acceptable final output, then one or more of the fixed variables in the matrixes can be changed. The user can also switch the variables in each pair so the non-fixed variable becomes the fixed variable and the fixed variable becomes the non-fixed variable. This will allow a complete new set of iterations.

(10) After all of the data elements on one level of a MINDBASE structure have been designed using the above process, the next level of data elements is designed. This procedure is continued until all data elements on all levels of a MINDBASE structure have been designed.

(11) This process can start with the data element on the top level of the structure and work down to the lowest level or it can start with the data elements on the lowest level of the structure and work up to the data element on the top level of the structure.

Figure 15:
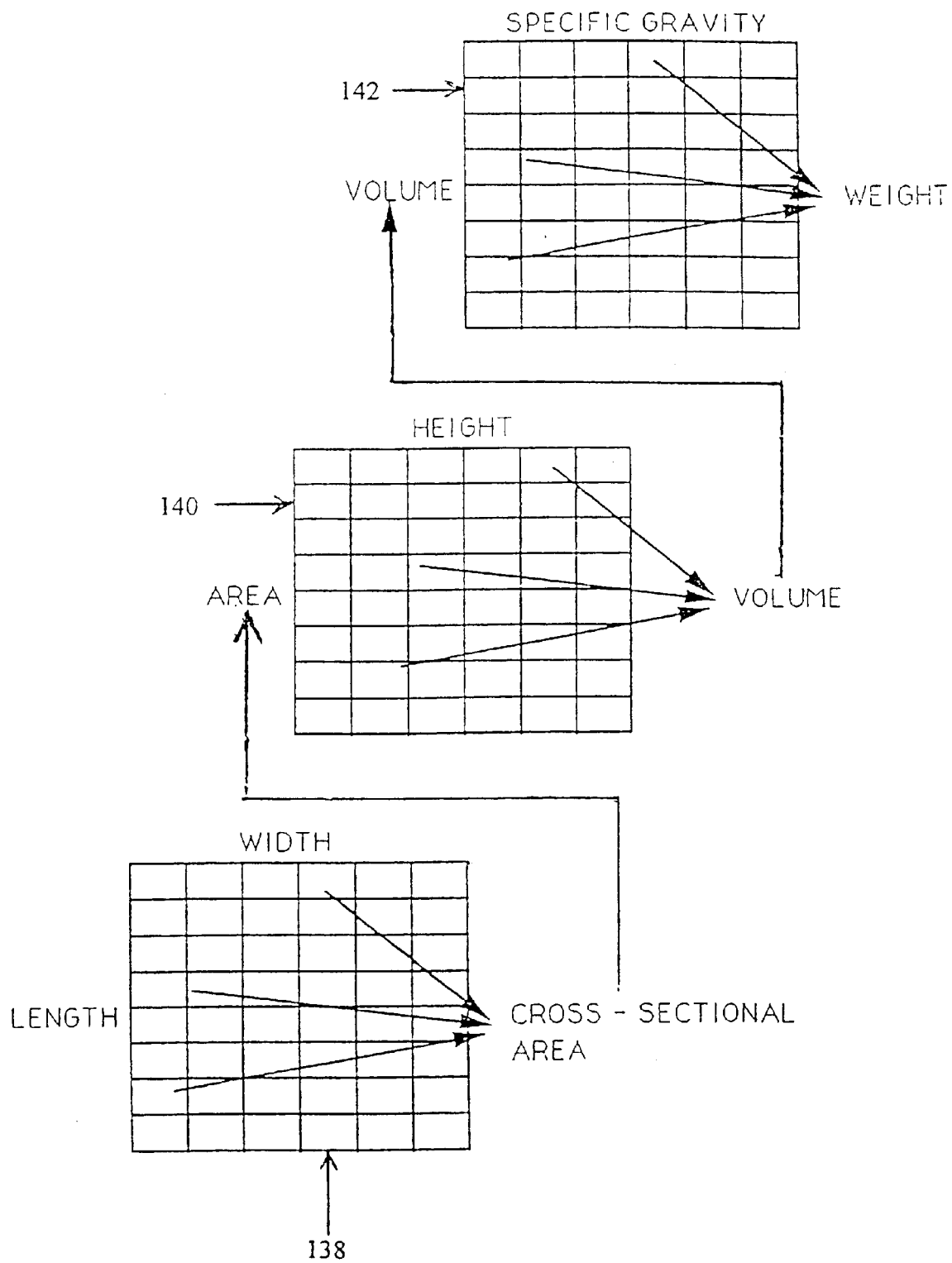
FIG. 15 shows matrixes useful for explaining a specific MINDBASE level by level search process.

An example of this process is designing a column whose weight is within a particular design specification. Three matrixes 138, 140 and 142 as shown in FIG. 15 can be used in this design process with each one representing a formula. The first matrix 138 represents the formula for the cross-sectional area of the column (length×width=area). The second matrix 140 represents the formula for the volume of the column (area×height=volume). The third matrix 142 represents the weight of the column (volume×specific gravity of the column=weight). The fixed variables will be the column variables.

A starting value is given to the length variable in the first matrix 138. The output value of the first matrix is the area which becomes the value for the rows in the second matrix 140. The output value of the second matrix is volume which becomes the value for the rows in the third matrix 142. The output value for the third matrix 142 is weight. The iteration process described above is used to design a column whose length, width, height, and weight are within acceptable design specifications.

To facilitate calculations of unknowns, the MINDBASE structures can contain as many mathematical formulas and as much engineering data as possible. These formulas can be stored in the form of predetermined matrixes. Users would quickly scan the index of the stored formulas to choose those that were needed. If needed formulas were not stored, the user could add them.

Every effort has been made to explain an entirely new kind of database system, and well as all of the methods needed to create, inter-relate, integrate, search, display and utilize database structures in accordance with the new system.

What is claimed is:

1. A database of information stored in a fixed medium, said database comprising:
   a set of tangible data elements, said tangible data elements representing things which have physical weight and can cause an effect;
   a set of intangible data elements, said intangible data elements representing words and concepts which have no physical weight and cannot be weighed;
   said set of intangible data elements including a first subset having effect data elements, said effect data elements representing at least one among verbs standing alone and verbs in combination with other words, which describe at least one among said tangible data elements, actions, objectives, results, missions, procedures and processes; and,
   said set of intangible data elements including a second subset having descriptive data elements, said descriptive data elements describing at least one among said tangible data elements, said effect data elements, degrees of performance of said tangible data elements, and the nature of the relationship between the tangible data elements and the effect data elements.

2. The database of claim 1, wherein:
   each said tangible data element is linked to each said effect data element partially or wholly caused by said tangible data element; and,
   each said effect element is linked to each said tangible data element required for said effect to occur.

3. The database of claim 1, wherein all said data elements are stored in hierarchal structures of parent-child relationships.

4. The database of claim 3, wherein each said tangible data element having any children in said hierarchal structure must have at least two of said children.

5. The database of claim 3, wherein each said effect data element can have any number of children in said hierarchal structure.

6. The database of claim 3, wherein, said hierarchal structure is a tree.

7. The database of claim 3, wherein said hierarchal structure is an outline.

8. The database of claim 3, wherein said hierarchal structure is a table.

9. The database of claim 1, wherein each said data element is stored only once.

10. The database of claim 3, wherein:
    each said data element is stored only once, and in a single location; and,
    each further occurrence of any of said data elements in said hierarchal structure is embodied as a link back to said single location.

11. The database of claim 10, wherein each said link back to each said single location enables each said further occurrence of said data elements to appear in displays and other physical representations of said database.

12. The database of claim 2, wherein each linked data element represents linked words from different sets or subsets of data elements, said linked words each having a respective, displayable and sortable characteristic which identifies a set or subset of origin.

13. The database of claim 2, wherein at least one of each said link between a tangible data element and an intangible data element is itself linked to at least one specific degree of performance that describes in more detail said cause-effect relationship established by said at least one link between a tangible data element and an intangible data element.

14. A database system, comprising:
    a database stored in a fixed medium and having a set of tangible data elements representing things which have physical weight and can cause an effect and a set of intangible data elements representing words and concepts which have no physical weight and cannot be weighed;
    said set of intangible data elements including a first subset having effect data elements representing at least one among verbs standing alone and verbs in combination with other words, which describe at least one among said tangible data elements, actions, objectives, results, missions, procedures and processes, and a second subset having descriptive data elements describing at least one among said tangible data elements, said effect data elements, degrees of performance of said tangible data elements and the nature of the relationship between the tangible data elements and the effect data elements; and,
    a dictionary routine for automatically classifying and storing words entered into said database according to said sets and subsets of data elements.

15. The database system of claim 14, wherein said dictionary routine categorizes each said word into one of tangible data effect data, descriptor data and other data.

16. The database system of claim 14, wherein said dictionary routine links all sets of synonyms of said words and all other of said words having a like meaning or conveying a like thought.

17. The database system of claim 14, wherein said dictionary routine identifies each of said words having at least two different meanings.

18. The database system of claim 14, wherein said dictionary routine stores all cause-effect relationships created by users of said database system.

19. The database system of claim 14, wherein:
    said dictionary routine categorizes each said word into one of tangible data, effect data, descriptor data and other data;
    said dictionary routine links all sets of synonyms of said words and all other of said words having a like meaning or conveying a like thought;
    said dictionary routine identifies each of said words having at least two different meanings; and,
    said dictionary routine stores all cause-effect relationships created by users of said database system.

20. A method for creating an information database in a fixed medium, comprising the steps of:

identifying tangible data elements of said information, said tangible data elements representing things which have physical weight and can cause an effect;

storing said tangible data elements of said information as a first set in said fixed medium;

identifying intangible data elements of said information, said intangible data elements representing words and concepts which have no physical weight and cannot be weighed;

identifying effect data elements within said intangible data elements, said effect data elements representing at least one among verbs standing alone and verbs in combination with other words, which describe at least one among said tangible data elements, actions, objectives, results, missions, procedures and processes;

storing said effect data elements of said information as a second set in said fixed medium;

identifying descriptive data elements within said intangible data elements, said descriptive data elements describing at least one among said tangible data elements, said effect data elements, degrees of performance of said tangible data elements, and the nature of the relationship between the tangible data elements and the effect data elements; and, storing said descriptive data elements of said information as a third set in said fixed medium.

21. The method of claim 20, further comprising the steps of:

linking each said tangible data element to each said effect data element partially or wholly caused by said tangible data element; and, linking each said effect element to each said tangible data element required for said effect to occur.

22. The method of claim 20, further comprising the step of storing all said data elements in hierarchal structures of parent-child relationships.

23. The method of claim 22, further comprising the step of providing each said tangible data element having any children in said hierarchal structure with at least two of said children.

24. The method of claim 22, wherein each said effect data element can have any number of children in said hierarchal structure.

25. The method of claim 22, further comprising the step of storing all said data elements in hierarchal tree structures.

26. The method of claim 22, further comprising the step of storing all said data elements in hierarchal outline structures.

27. The method of claim 22, further comprising the step of storing all said data elements in hierarchal table structures.

28. The method of claim 20, comprising the step of storing each said data element only once.

29. The method of claim 22, further comprising the steps of:

storing each said data element only once, and in a single location; and, embodying each further occurrence of any of said data elements in said hierarchal structure as a link back to said single location.

30. The method of claim 29, further comprising the step of referring to each said link back to each said single location to enable each said further occurrence of said data elements to appear in displays and other physical representations of said database.

31. The method of claim 21, further comprising the step of uniquely identifying words represented by said linked data elements as originating in different ones of said sets of data elements by respective, displayable and sortable characteristics which identify said set of origin.

32. The method of claim 21, further comprising the step of linking at least one of each said link between a tangible data element and an intangible data element to at least one specific degree of performance that describes in more detail said cause-effect relationship established by said at least one link between a tangible data element and an intangible data element.

33. A method for establishing and managing a database, comprising the steps of:

storing a database in a fixed medium;

dividing said database into a set of tangible data elements representing things which have physical weight and can cause an effect and a set of intangible data elements representing words and concepts which have no physical weight and cannot be weighed;

dividing said set of intangible data elements into a first subset of effect data elements representing at least one among verbs standing alone and verbs in combination with other words, which describe at least one among said tangible data elements, actions, objectives, results, missions, procedures and processes, and a second subset of descriptive data elements describing at least one among said tangible data elements, said effect data elements, degrees of performance of said tangible data elements, and the nature of the relationship between the tangible data elements and the effect data elements; and, automatically classifying and storing words entered into said database according to said sets and subsets of data elements.

34. The method of claim 33, further comprising the step of automatically categorizing said words into one of tangible data, effect data, descriptor data and other data.

35. The method of claim 33, further comprising the step of automatically linking sets of synonyms of said words and all other of said words having a like meaning or conveying a like thought.

36. The method of claim 33, further comprising the step of automatically identifying each of said words having at least two different meanings.

37. The method of claim 32, further comprising the step of storing all cause-effect relationships created by users of said database system.

38. The method of claim 15, further comprising the steps of:

automatically categorizing each said word into one of tangible data, effect data, descriptor data and other data;

automatically linking sets of synonyms of said words and all other of said words having a like meaning or conveying a like thought;

automatically identifying each of said words having at least two different meanings; and, automatically storing all cause-effect relationships created by users of said database system.

39. The method of claim 37, further comprising the step of generating a dictionary, said generating of said dictionary implementing said steps of categorizing words, linking sets of synonyms, identifying said words having different meanings and storing all cause-effect relationships.

40. The method of claim 33, further comprising the step of generating a dictionary, said generating of said dictionary implementing said step of automatically classifying and storing words entered into said database.

41. A database of information stored in a fixed medium, said database comprising:
- a set of tangible data elements, said tangible data elements representing things which have physical weight and can cause an effect;
- a set of intangible data elements, said intangible data elements representing words and concepts which have no physical weight and cannot be weighed;
- said set of intangible data elements including a first subset having effect data elements, said effect data elements representing at least one among verbs standing alone and verbs in combination with other words, which describe at least one among said tangible data elements, actions, objectives, results, missions, procedures and processes;
- said set of intangible data elements including a second subset having descriptive data elements, said descriptive data elements describing at least one among said tangible data elements, said effect data elements, degrees of performance of said tangible data elements, and the nature of the relationship between the tangible data elements and the effect data elements;
- each said tangible data element being linked to each said effect data element partially or wholly caused by said tangible data element;
- each said effect element being linked to each said tangible data element required for said effect to occur; and,
- all said data elements being stored in hierarchal structures of parent-child relationships, said hierarchal structures defining vertical lines and horizontal levels.

42. The database of claim 41, wherein at least one of each said link between a tangible data element and an intangible data element is itself linked to at least one specific degree of performance that describes in more detail said cause-effect relationship established by said at least one link between a tangible data element and an intangible data element.

43. A method for inter-relating different databases structured as recited in claim 41, comprising the steps of:
- for each of said databases, and in any order, normalizing names of like data elements having different names in said different databases and normalizing names of different data elements having like names in said different databases;
- normalizing data elements which are separate in any one of said databases and which are grouped together as single data elements in any other of said databases;
- comparing each of said normalized databases with each other one of said normalized databases;
- recording all common data elements found during each said comparing step; and,
- recording one location of each said common data element in each of said databases.

44. A method for integrating heterogeneous database structures, corresponding to the hierarchal form of the database recited in claim 41, comprising the steps of:
- proceeding with said integrating if respective top level data elements in said heterogeneous databases and said parts thereof are substantially the same or differentiated only by descriptors;
- for each of said database structures, and in any order, normalizing names of like data elements having different names in said different databases and normalizing names of different data elements having like names in said different databases;
- normalizing data elements which are separate in any one of said database structures and which are grouped together as single data elements in any other of said database structures;
- selecting one of said database structures to be an integrated database structure;
- relocating all data elements in all substructures of the remaining database structures into said integrated database structure, downwardly level by level in said hierarchal form; and,
- recording each new and old location of each said relocated data element as a cross reference.

45. The method of claim 44, wherein all parent-child relationships in said database structures are retained in the integrated database structure.

46. The method of claim 45, further comprising the step of adding intermediary data elements between respective parents and children.

* * * * *

UNITED STATES PATENT AND TRADEMARK OFFICE
CERTIFICATE OF CORRECTION

PATENT NO. : 6,665,680 B2
DATED : December 16, 2003
INVENTOR(S) : Sharp et al.

It is certified that error appears in the above-identified patent and that said Letters Patent is hereby corrected as shown below:

Column 1,
Line 54, should not start a new paragraph.

Column 8,
Line 4, delete "mar" and replace with -- man --.
Line 26, delete "." after the word "cake".
Line 34, delete "." after the word "or".

Column 13,
Line 9, delete "56" and replace with -- 50 --.

Column 16,
Line 63, delete ";" after the word "red".

Column 21,
Line 21, delete "." after the word "node".

Column 22,
Line 40, delete "." after the word "the".

Column 23,
Line 6, delete "," after the word "there".
Lien 29, delete "." after the word "Prospective".

Column 24,
Line 40, delete ""All and "NB"" and replace with -- "A and B" --.
Line 67, delete "ross" and replace with -- cross --.

Column 25,
Line 13, delete ";'" after the word "this".
Line 27, delete "." after the word "position".

Column 26,
Line 54, delete "ii" and replace with -- in --.

Column 28,
Line 61, delete "." after the word "the".

UNITED STATES PATENT AND TRADEMARK OFFICE
CERTIFICATE OF CORRECTION

PATENT NO.     : 6,665,680 B2
DATED          : December 16, 2003
INVENTOR(S)    : Sharp et al.

It is certified that error appears in the above-identified patent and that said Letters Patent is hereby corrected as shown below:

Column 30,
Line 6, insert -- (4) -- before the word "If" and begin a new paragraph.
Line 32, delete "right ward" and replace with -- rightward --.
Line 44, delete "left ward" and replace with -- leftward --.
Line 46, delete "19" and replace with -- 10 --.
Line 60, delete "," after the word "child".

Column 31,
Line 25, delete "pow" and replace with -- now --.

Column 32,
Line 5, delete "," after the word "a".
Line 32, the number "30" should not be bold.

Column 33,
Line 5, delete "." after the word "certain".

Column 38,
Line 60, begin a new paragraph after the word "and,".

Signed and Sealed this

Tenth Day of August, 2004

JON W. DUDAS
*Acting Director of the United States Patent and Trademark Office*